US008867556B2

(12) United States Patent
Kim

(10) Patent No.: US 8,867,556 B2
(45) Date of Patent: Oct. 21, 2014

(54) APPARATUS AND METHOD FOR DETERMINING POSITION OF SENSOR NODE IN LOCATION SERVICE BASED SYSTEM

(75) Inventor: Min-Su Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 13/300,927

(22) Filed: Nov. 21, 2011

(65) Prior Publication Data

US 2012/0134348 A1 May 31, 2012

(30) Foreign Application Priority Data

Nov. 25, 2010 (KR) ........................ 10-2010-0117858

(51) Int. Cl.
*H04L 12/56* (2006.01)
*H04W 4/00* (2009.01)
*H04W 64/00* (2009.01)
*H04W 40/20* (2009.01)
*G01S 5/02* (2010.01)
*H04W 4/02* (2009.01)
*H04W 8/12* (2009.01)
*H04L 29/08* (2006.01)

(52) U.S. Cl.
CPC ................ *H04W 40/20* (2013.01); *G01S 5/02* (2013.01); *H04W 4/022* (2013.01); *H04W 8/12* (2013.01); *H04W 4/001* (2013.01); *H04W 64/00* (2013.01); *H04L 67/12* (2013.01)
USPC .......................................................... 370/401

(58) Field of Classification Search
CPC ......... G01S 5/02; G01S 5/0252; G01S 19/05; H04W 4/02; H04W 4/22; H04W 64/00; H04W 76/007
See application file for complete search history.

(56) References Cited

U.S. PATENT DOCUMENTS

| 2006/0058042 | A1* | 3/2006 | Shim ........................ 455/456.3 |
| 2007/0082681 | A1* | 4/2007 | Kim et al. .................. 455/456.1 |
| 2007/0182547 | A1* | 8/2007 | Wachter et al. ........... 340/539.13 |
| 2007/0281662 | A1* | 12/2007 | Kim et al. .................. 455/404.2 |
| 2007/0286212 | A1* | 12/2007 | Kim et al. ..................... 370/398 |
| 2008/0113671 | A1* | 5/2008 | Ghozati et al. ............. 455/456.1 |
| 2008/0126535 | A1* | 5/2008 | Zhu et al. ...................... 709/224 |

* cited by examiner

*Primary Examiner* — Yong Zhou
(74) *Attorney, Agent, or Firm* — Jefferson IP Law, LLP

(57) ABSTRACT

An apparatus and method for determining a position of a sensor node in a location service based system are provided. An operation method of a Secure User Plane Location (SUPL) Location Platform (SLP) for determining a position of a sensor node in a location service based system includes receiving a position determination request for a sensor node from an SUPL agent, interworking with a Location Registration Server (LRS) and acquiring routing information of the sensor node, sending a position determination start request for the sensor node to a gateway mapped to the sensor node using the acquired routing information, and interworking with the gateway and determining the position of the sensor node.

22 Claims, 14 Drawing Sheets

APPARATUS AND METHOD FOR DETERMINING POSITION OF SENSOR NODE IN LOCATION SERVICE BASED SYSTEM

PRIORITY

This application claims the benefit under 35 U.S.C. §119 (a) of a Korean patent application filed in the Korean Intellectual Property Office on Nov. 25, 2010 and assigned Serial No. 10-2010-0117858, the entire disclosure of which is hereby incorporated by reference.

BACKGROUND OF THE INVENTION

1. Field of the Invention

The present invention relates to an apparatus and method for determining a position of a sensor node in a location service based system. More particularly, the present invention relates to an apparatus and method for determining a position of a device connected through a gateway, i.e., a terminal (e.g., a sensor node) whose routing is impossible to an Internet Protocol (IP) address, using the Open Mobile Alliance (OMA) standard in a location service based system.

2. Description of the Related Art

Generally, a mobile communication system has a related function unit for determining a position of a terminal in a mobile communication network and, by periods or according to a request, provides a location service forwarding a position of a terminal to a constant entity.

A network structure associated with a location service may differ depending on an internal network structure of 3rd Generation Partnership Project (3GPP) or 3GPP2 and the like. As a method for determining a present position of a terminal, there are a method of forwarding an identifier of a cell to which a terminal belongs, a method of, after measuring time during which signals reach each adjacent BS from a terminal, determining a position of the terminal using triangulation, a method using a Global Positioning System (GPS), and the like.

In order to provide a location service to a user, many signals are forwarded between a terminal and a server. Accordingly, standardized positioning technologies for providing a location service are under development. One of these technologies is Secure User Plane Location (SUPL) defined in OMA.

Commonly, an SUPL network includes an SUPL agent, an SUPL Location Platform (SLP), an SUPL Enabled Terminal (SET), and the like. The SUPL agent is a logical service access point that uses position information of an actually determined SET. The SLP is an SUPL service access point of a network part which accesses network resources to obtain the position information of the SET. The SET is an entity capable of communicating by an Internet Protocol (IP) address with the SUPL network that uses an SUPL interface. The SET interworks with a network through a user plane bearer and supports procedures defined in SUPL.

The SLP, a network constituent element, includes an SUPL Positioning Center (SPC) that is an entity determining an actual location, and an SUPL Location Center (SLC) that is an entity performing roaming and resource management and the like. Also, a location service based system can be realized in a proxy mode and a non-proxy mode. The proxy mode is a mode in which the SET communicates with the SLC itself to determine a position. The non-proxy mode is a mode in which the SET communicates with the SLC via the SPC to determine a position.

On the other hand, the SUPL, a technology defining a technique of position determination in an IP network, is now considering only a terminal (i.e., SET) having an IP address as a position determination target. However, due to the advent of various location services, position determination enhancement is required and together, a technology for determining a position of a terminal (hereinafter, referred to as a Sensor Node (SN)) whose routing to an IP address is impossible is increasingly needed. Also, communication between an SUPL network and an SN should go through a gateway, so there is a need to consider this in an existing position determination protocol.

SUMMARY OF THE INVENTION

Aspects of the present invention are to address at least the above-mentioned problems and/or disadvantages and to provide at least the advantages below. Accordingly, one aspect of the present invention is to provide an apparatus and method for determining a position of a sensor node in a location service based system.

Another aspect of the present invention is to provide an apparatus and method for determining a position of a device connected through a gateway, i.e., a terminal (e.g., a Sensor Node (SN)) whose routing by an Internet Protocol (IP) address is impossible, by expanding standardized protocols for the sake of determining a position of a device having an IP address in Open Mobile Alliance (OMA) in a location service based system.

The above aspects are achieved by providing an apparatus and method for determining a position of a sensor node in a location service based system.

In accordance with an aspect of the present invention, an operation method of a Secure User Plane Location (SUPL) Location Platform (SLP) for determining a position of a sensor node in a location service based system is provided. The method includes receiving a position determination request for a sensor node from an SUPL agent, interworking with a Location Registration Server (LRS) and acquiring routing information of the sensor node, sending a position determination start request for the sensor node to a gateway mapped to the sensor node using the acquired routing information, and interworking with the gateway and determining a position of the sensor node.

In accordance with another aspect of the present invention, an operation method of an SLP for determining a position of a sensor node in a location service based system is provided. The method includes receiving a position determination request for a sensor node from an SUPL agent, interworking with an LRS and acquiring routing information of the sensor node, determining position information on the sensor node from the acquired routing information, and transmitting the determined position information on the sensor node to the SUPL agent.

In accordance with a further aspect of the present invention, an operation method of an SLP for determining a position of a sensor node in a location service based system is provided. The method includes receiving a position determination request for a sensor node from an SUPL agent, sending a position determination start request for the sensor node to an LRS, and interworking with the LRS and determining a position of the sensor node.

In accordance with yet another aspect of the present invention, an SLP apparatus for determining a position of a sensor node in a location service based system is provided. The apparatus includes a reception modulator/demodulator (modem), a position determination manager, and a transmission modem. The reception modem receives a position determination request for a sensor node from an SUPL agent. The position determination manager interworks with an LRS and acquires routing information of the sensor node. The transmission modem sends a position determination start request for the sensor node to a gateway mapped to the sensor node using the acquired routing information. The position determination manager interworks with the gateway and determines a position of the sensor node.

In accordance with still another aspect of the present invention, an SLP apparatus for determining a position of a sensor node in a location service based system is provided. The apparatus includes a reception modem, a position determination manager, and a transmission modem. The reception modem receives a position determination request for a sensor node from an SUPL agent. The position determination manager interworks with an LRS, acquires routing information of the sensor node, and determines position information on the sensor node from the acquired routing information. The transmission modem transmits the determined position information on the sensor node to the SUPL agent.

In accordance with still another aspect of the present invention, an SLP apparatus for determining a position of a sensor node in a location service based system is provided. The apparatus includes a reception modem, a transmission modem, and a position determination manager. The reception modem receives a position determination request for a sensor node from an SUPL agent. The transmission modem sends a position determination start request for the sensor node to an LRS. The position determination manager interworks with the LRS and determines a position of the sensor node.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Below, exemplary embodiments of the present invention provide a way for expanding standardized protocols for the sake of determining a position of a device having an Internet Protocol (IP) address in an Open Mobile Alliance (OMA) system, and determining a position of a device connected through a gateway, i.e., a terminal (e.g., a Sensor Node (SN)) whose routing to the IP address is impossible in a location service based system.

The following description is made based on a case where a network requests for determining a position of a sensor node but, undoubtedly, it is also identically applied to a case where a sensor node requests for determining a position of the sensor node. In this case, a Secure User Plane Location (SUPL) agent can exist within the sensor node.

Figure 1:
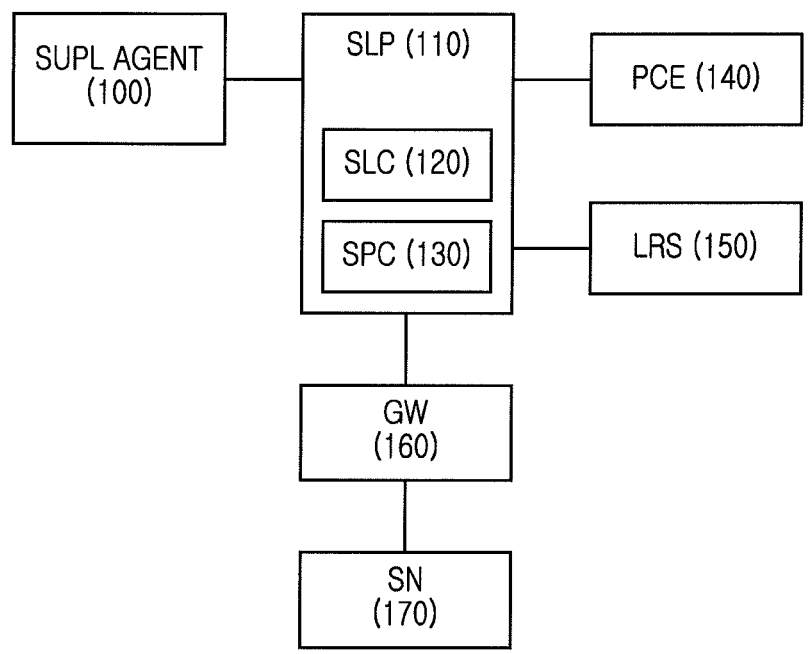
FIG. 1 is a diagram illustrating a structure of a location service based system according to an exemplary embodiment of the present invention.

FIG. 1 is a diagram illustrating a structure of a location service based system according to an exemplary embodiment of the present invention.

As illustrated, the location service based system considered in the present invention includes an SUPL agent 100, an SUPL Location Platform (SLP) 110, a Privacy Checking Entity (PCE) 140, a Location Registration Server (LRS) 150, a GateWay (GW) 160, and a Sensor Node (SN) 170. The SLP 110 includes an SUPL Location Center (SLC) 120 and an SUPL Positioning Center (SPC) 130.

Referring to FIG. 1, the SUPL agent 100 is a logical service access point that uses position information of an actually determined SUPL Enabled Terminal (SET). The SUPL agent 100 sends the SLP 110 a request for determining a position of the SN 170, and acquires position information of the SN 170 from the SLP 110.

The SLP 110 is an SUPL service access point of a network part that accesses network resources to obtain position information of the SN 170. The SLP 110 includes an SLC 120 and an SPC 130. The SLC 120 performs roaming and resource management for the SN 170 and the like. Particularly, in a case where the SLC 120 receives a request for determining a position of the SN 170 from the SUPL agent 100, the SLC 120 interworks with the PCE 140 and acquires a result of authentication on an authority of the SUPL agent 100 for the SN 170, and interworks with the LRS 150 and acquires routing information of the SN 170. Also, in a case where the GW 160 performs a role of the SPC 130, the SLC 120 manages a corresponding GW 160 list. The SPC 130 determines a position of the SN 170. Particularly, the SPC 130 interworks with the GW 160 mapped to the SN 170 to determine a position of the SN 170, and provides position information of the SN 170 to the SUPL agent 100. In all protocols transmitted/received for the sake of determining a position of a target node, the SLC 120 and SPC 130 include a GateWay IDentifier (GW ID) and a Sensor Node IDentifier (SN ID) in an ID part of the target node.

According to a request of the SLC 120, the PCE 140 performs authentication on an authority of the SUPL agent 100 for the SN 170, and provides the authority authentication result to the SLC 120. That is, the PCE 140 authenticates if the SUPL agent 100 has authority to request determining a position of the SN 170.

The LRS 150 stores and manages routing information of the SN 170, i.e., mapping information of an SN ID and a GW ID and capability information of an SN and a GW. According to a request of the SLC 120, the LRS 150 provides the SLC 120 with the GW ID mapped to the SN ID and capability information of a corresponding SN and GW.

The GW 160 connects with the SLP 110 using an IP address of the SN 170, and performs a function of substituting the SN 170. Also, the GW 160 can also perform a role of the SPC 130.

The SN 170 is a device connecting with the SLP 110 through the GW 160 using a Media Access Control (MAC) address, not the IP address. An ID of the SN 170 may include a 64-bit extended address, or may include a combination of a 16-bit short address and a GW ID, or may include a Bluetooth ID, or may include a Zigbee ID.

Figure 2:
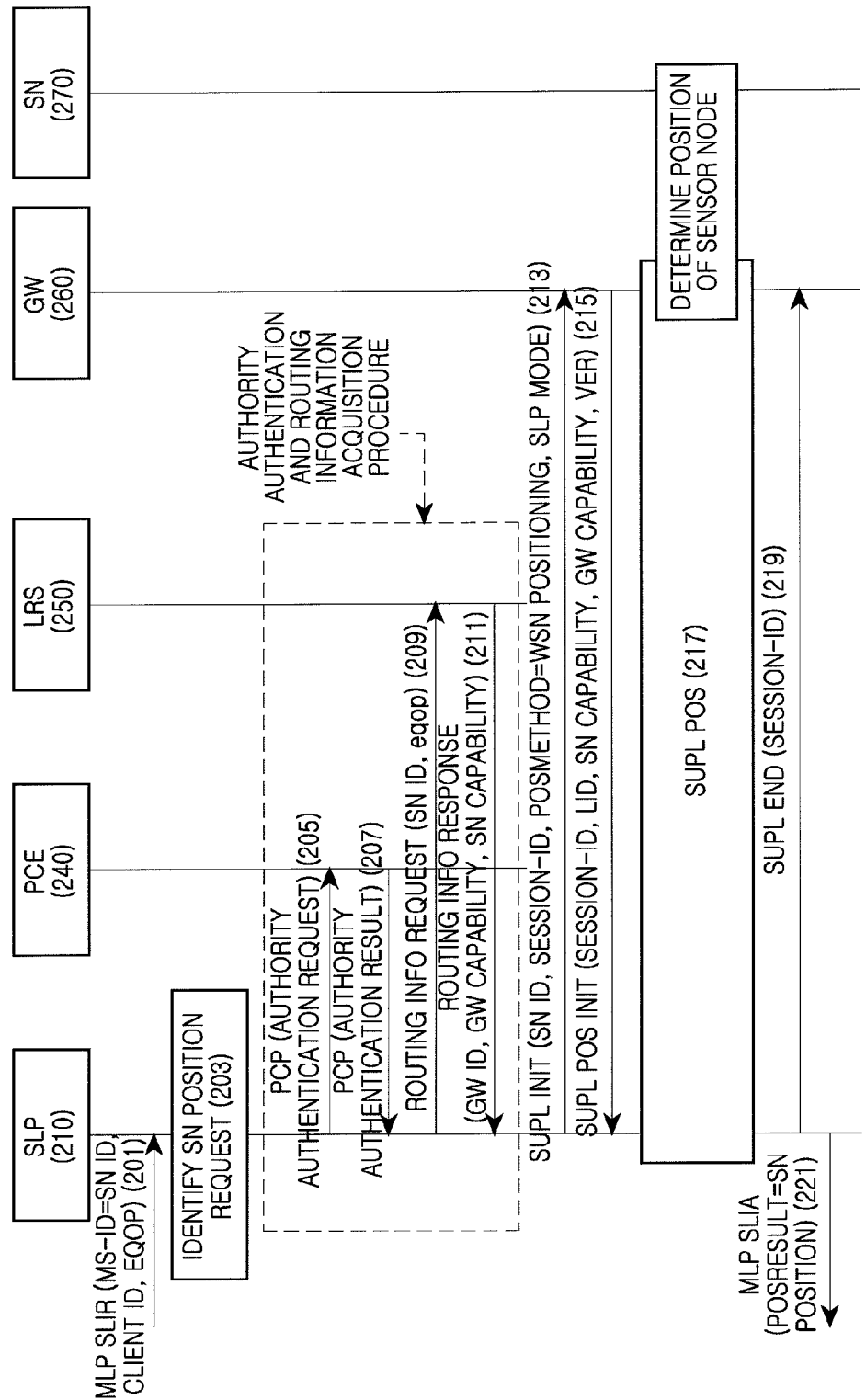
FIG. 2 is a signal flow diagram illustrating an immediate service procedure in a network-initiated proxy mode in a location service based system according to a first exemplary embodiment of the present invention.

FIG. 2 is a signal flow diagram illustrating an immediate service procedure in a network-initiated proxy mode in a location service based system according to a first exemplary embodiment of the present invention.

Referring to FIG. 2, an SUPL agent (not shown), which provides various services using position information of an SN 270 in a network performing communication based on an SUPL protocol, sends a Mobile Location Protocol Standard Location Immediate Request (MLP SLIR) message to an SLP 210 to request an immediate service about a current position of the SN 270 at step 201. Here, the MLP SLIR message includes an SN ID as a terminal identifier (MS-ID) that is a target, a client identifier (client ID) as an identifier of the SUPL agent (not shown) having requested the position information of the SN 270, and an Expected Quality Of Position (EQOP) of the requested position information.

Upon receiving the MLP SLIR message, the SLP 210 confirms the terminal identifier (MS-ID) within the received MLP SLIR message and, in a case where the confirmed terminal identifier (MS-ID) is the SN ID, the SLP 210 determines that the received MLP SLIR message is a message requesting the position information of the SN 270 at step 203.

Upon determining that the received MLP SLIR message is the message requesting the position information of the SN 270, the SLP 210 sends a request for authentication on an authority of the SUPL agent (not shown) for position determination of the SN 270 to the PCE 240 through a Privacy Check Protocol (PCP) at step 205.

Upon receiving the authority authentication request, the PCE 240 performs the authentication on the authority of the SUPL agent (not shown) for the position determination of the SN 270, and forwards the authority authentication result to the SLP 210 at step 207.

Upon receiving the authority authentication result, the SLP 210 sends a routing information request message to the LRS 250 to request routing information of the SN 270. Here, the routing information request message includes the SN ID, and the EQOP requested from the SUPL agent (not shown) t step 209.

Upon receiving the routing information request message, the LRS 250 sends a routing information response message to the SLP 210 to provide the routing information of the SN 270, i.e., a GW ID mapped to the SN ID and capability information of the SN 270 and a GW 260 at step 211. Here, the capability information of the GW 260 includes information on a position determination method supportable by the GW 260 and the like. Also, the capability information of the SN 270 includes information on a position determination method supportable by the SN 270, a relative distance of the SN 270 from the GW 260, and the like.

Upon receiving the routing information response message, the SLP 210 sends an SUPL Initiate (SUPL INIT) message to the GW 260 mapped to the SN 270 to request position determination initiation for the SN 270 at step 213. Here, the SUPL INIT message includes information on an SN ID, a session identifier (session-ID), a positioning method (posmethod), and an SLP mode. For example, the positioning method can include a Wireless Sensor Network (WSN) positioning method. Here, the SLP mode represents a mode in which position determination is carried out and is, for example, one of a proxy mode and a non-proxy mode.

Upon receiving the SUPL INIT message, the GW 260 in place of the SN 270 sends an SUPL Positioning Initiate (SUPL POS INIT) message to the SLP 210 to initiate position determination at step 215. Here, the SUPL POS INIT message includes information on a session identifier (session-ID), a location identifier (LID) for identifying a currently located network, a capability of the SN 270, a capability of the GW 260, and a version (VER).

Upon receiving the SUPL POS INIT message, the SLP 210 interworks with the GW 260 and performs an SUPL positioning (SUPL POS) procedure, thereby determining a position of the SN 270 at step 217. At this time, there can be a case where a position of the GW 260 should be first determined in order to determine the position of the SN 270. In this case, the position of the GW 260 is determined concurrently. The order of the position determination of the GW 260 and the position determination of the SN 270 is irrelevant.

In a case where the position determination of the SN 270 ends, the SLP 210 sends an SUPL END message to the GW 260 to end an SUPL session at step 219. Here, the SUPL END message includes a session-ID.

After completing the end of the SUPL session, the SLP 210 sends a Mobile Location Protocol Standard Location Immediate Answer (MLP SLIA) message to the SUPL agent (not shown) to forward the determined position information of the SN 270 at step 221.

Figure 3:
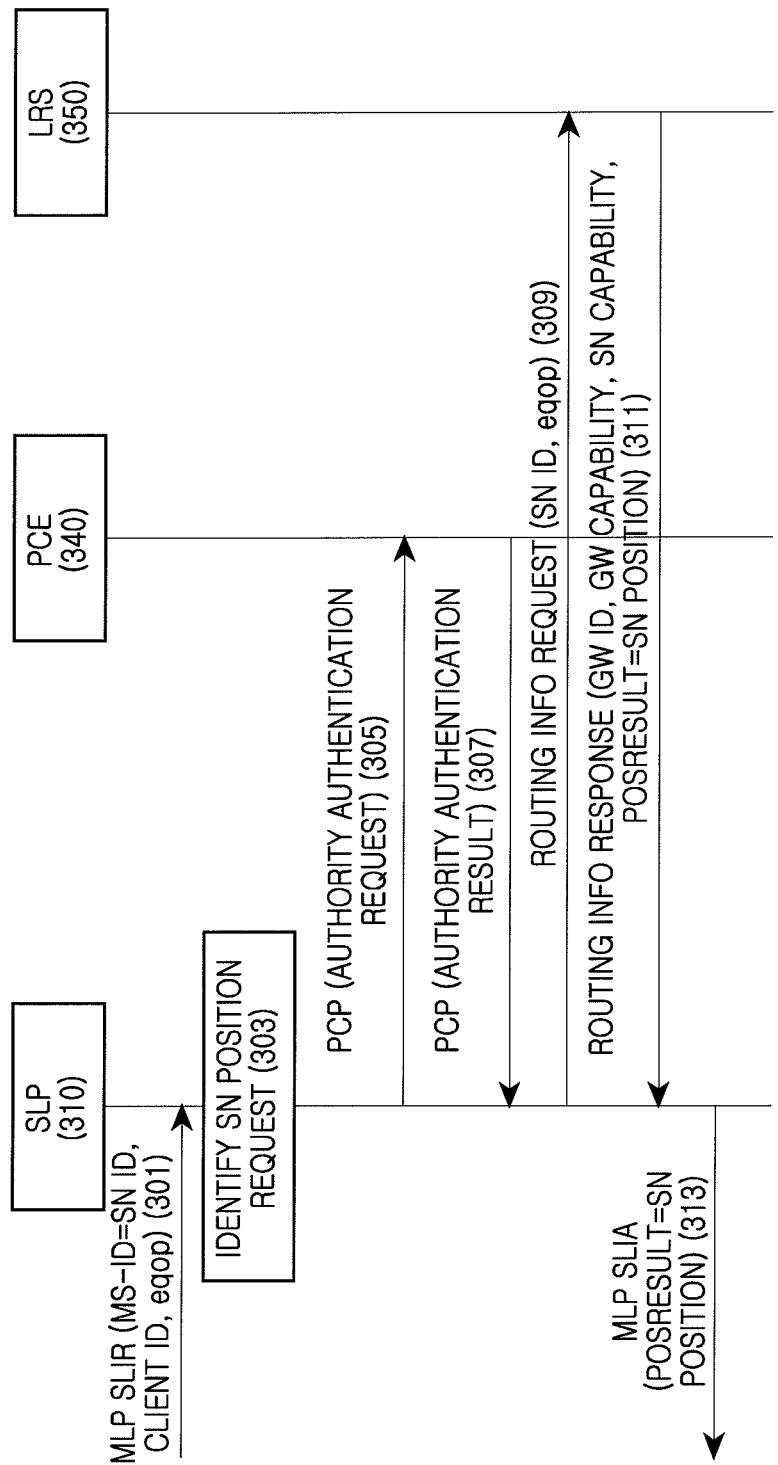
FIG. 3 is a signal flow diagram illustrating an immediate service procedure in a case where a Location Registration Server (LRS) has position information of a Sensor Node (SN) meeting an Expected Quality Of Position (EQOP), in a network-initiated proxy mode in a location service based system according to a second exemplary embodiment of the present invention.

FIG. 3 is a signal flow diagram illustrating an immediate service procedure in a case where an LRS has position information of an SN meeting an EQOP, in a network-initiated proxy mode in a location service based system according to a second exemplary embodiment of the present invention.

Referring to FIG. 3, an SUPL agent (not shown), which intends to provide various services using position information of an SN (not shown) in a network performing communication based on an SUPL protocol, sends an MLP SLIR message to an SLP 310 to request an immediate service about a current position of the SN (not shown) at step 301. Here, the MLP SLIR message includes an SN ID as a terminal identifier (MS-ID) that is a target, a client identifier (client ID) as an identifier of the SUPL agent (not shown) having requested for the position information of the SN (not shown), and an EQOP of the requested position information.

Upon receiving the MLP SLIR message, the SLP 310 confirms the terminal identifier (MS-ID) within the received MLP SLIR message and, in a case where the confirmed terminal identifier (MS-ID) is the SN ID, the SLP 310 determines that the received MLP SLIR message is a message requesting the position information of the SN (not shown) at step 303.

Upon determining that the received MLP SLIR message is the message requesting the position information of the SN (not shown), the SLP 310 sends a request for authentication on an authority of the SUPL agent (not shown) for position determination of the SN (not shown) to the PCE 340 through a PCP at step 305.

Upon receiving the authority authentication request, the PCE 340 performs the authentication on the authority of the SUPL agent (not shown) for the position determination of the SN (not shown), and forwards the authority authentication result to the SLP 310 at step 307.

Upon receiving the authority authentication result, the SLP 310 sends a routing information request message to the LRS 350 to request routing information of the SN (not shown). Here, the routing information request message includes the SN ID, and the EQOP requested from the SUPL agent (not shown) at step 309.

Upon receiving the routing information request message, the LRS 350 sends a routing information response message to the SLP 310 to provide the routing information of the SN (not shown) at step 311. Here, in a case where the LRS 350 has stored the position information of the SN (not shown) meeting the EQOP requested by the SUPL agent (not shown), the routing information response message includes a GW ID mapped to the SN ID, capability information of the SN (not shown) and a GW (not shown), and the position information of the SN (not shown). Here, the capability information of the GW (not shown) includes information on a position determination method supportable by the GW (not shown) and the like. Also, the capability information of the SN (not shown) includes information on a position determination method supportable by the SN (not shown), a relative distance of the SN (not shown) from the GW (not shown), and the like.

Upon receiving the routing information response message, the SLP 310 sends an MLP SLIA message to the SUPL agent (not shown) to forward the position information of the SN (not shown) at step 313.

Figure 4:
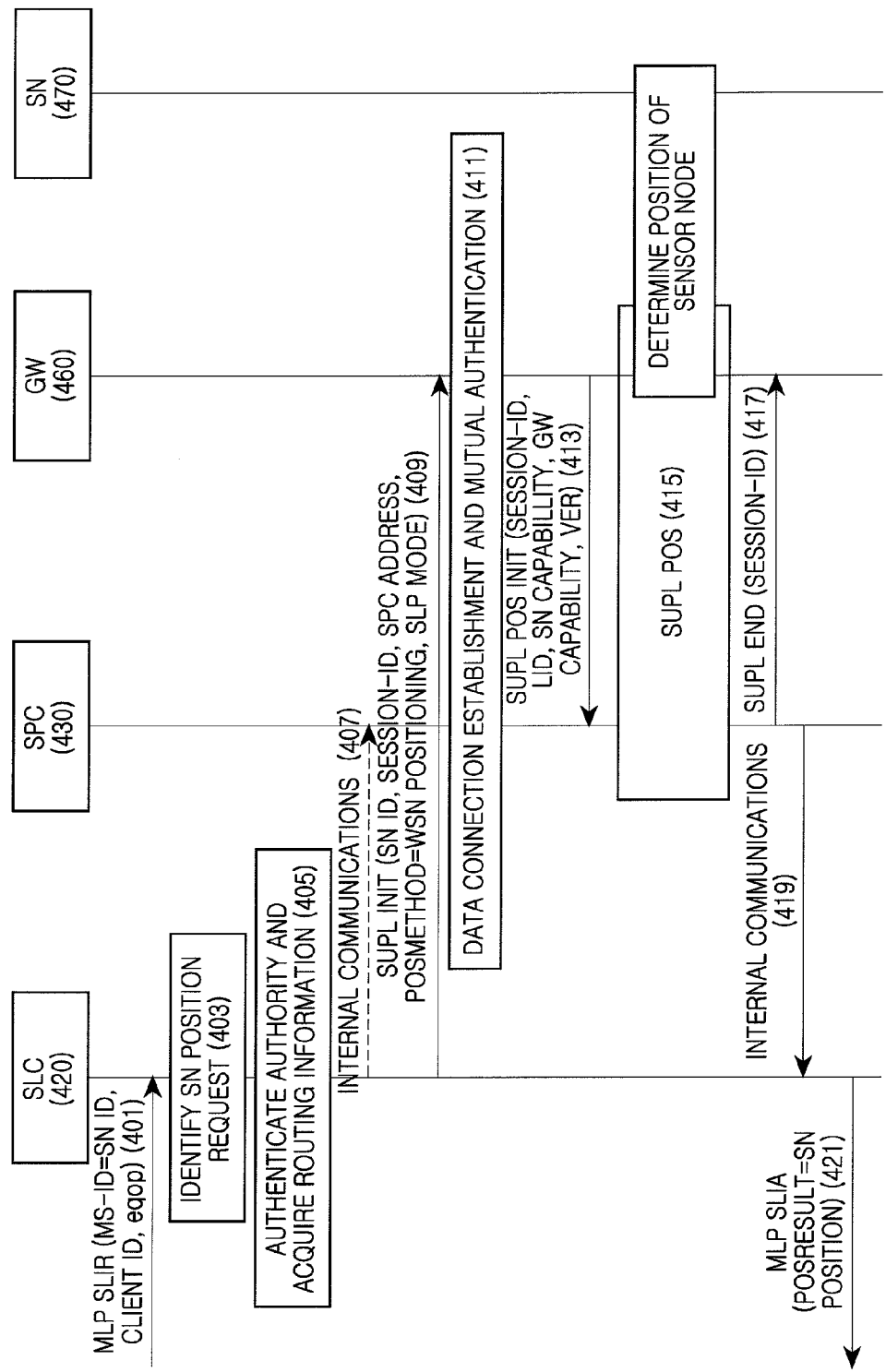
FIG. 4 is a signal flow diagram illustrating an immediate service procedure in a network-initiated non-proxy mode in a location service based system according to a third exemplary embodiment of the present invention.

FIG. 4 is a signal flow diagram illustrating an immediate service procedure in a network-initiated non-proxy mode in a location service based system according to a third exemplary embodiment of the present invention.

Referring to FIG. 4, an SUPL agent (not shown), which intends to provide various services using position information of an SN 470 in a network performing communication based on an SUPL protocol, sends an MLP SLIR message to an SLC 420 to request an immediate service about a current position of the SN 470 at step 401. Here, the MLP SLIR message includes an SN ID as a terminal identifier (MS-ID) that is a target, a client identifier (client ID) as an identifier of the SUPL agent (not shown) having requested for the position information of the SN 470, and an EQOP of the requested position information.

Upon receiving the MLP SLIR message, the SLC 420 confirms the terminal identifier (MS-ID) within the received MLP SLIR message and, in a case where the confirmed terminal identifier (MS-ID) is the SN ID, the SLC 420 determines that the received MLP SLIR message is a message requesting the position information of the SN 470 at step 403.

Upon determining that the received MLP SLIR message is the message requesting the position information of the SN 470, the SLC 420 interworks with a PCE (not shown) and acquires an authority authentication result of the SUPL agent (not shown) for position determination of the SN 470, and interworks with an LRS (not shown) and acquires routing information of the SN 470 at step 405. In other words, the SLC 420 sends a request for authentication on an authority of the SUPL agent (not shown) for the position determination of the SN 470 to the PCE (not shown) through a PCP, and receives the authority authentication result from the PCE (not shown). Also, the SLC 420 sends a routing information request message to the LRS (not shown) to request the routing information of the SN 470, and receives a routing information response message from the LRS (not shown) to acquire the routing information of the SN 470. Here, the routing information request message includes the SN ID, and the EQOP requested from the SUPL agent (not shown), and the routing information response message includes a GW ID mapped to the SN ID, and capability information of the SN 470 and a GW 460. Here, the capability information of the GW 460 includes information on a position determination method supportable by the GW 460 and the like. Also, the capability information of the SN 470 includes information on a position determination method supportable by the SN 470, a relative distance of the SN 470 from the GW 460, and the like.

Upon acquiring the routing information of the SN 470, the SLC 420 initiates internal communications and forwards the received MLP SLIR message to an SPC 430 at step 407.

The SLC 420 sends an SUPL INIT message to the GW 460 mapped to the SN 470 to request position determination initiation for the SN 470 at step 409. Here, the SUPL INIT message includes information on an SN ID, a session identifier (session-ID), an SPC address, a positioning method (posmethod), and an SLP mode. For example, the positioning method (posmethod) can include a WSN positioning method. Here, the SLP mode represents a mode in which position determination is carried out and is, for example, one of a proxy mode and a non-proxy mode.

Upon receiving the SUPL INIT message, the GW 460 interworks with the SPC 430 and establishes a data connection, and performs mutual authentication at step 411.

After completing the data connection establishment and the mutual authentication, the GW 460 in place of the SN 470 sends an SUPL POS INIT message to the SPC 430 to initiate position determination at step 413. Here, the SUPL POS INIT message includes information on a session identifier (session-ID), a location identifier (LID) for identifying a currently located network, a capability of the SN 470, a capability of the GW 460, and a version (VER).

Upon receiving the SUPL POS INIT message, the SPC 430 interworks with the GW 460 and performs an SUPL POS procedure, thereby determining a position of the SN 470 at step 415. At this time, there can be a case where a position of the GW 460 should be first determined in order to determine the position of the SN 470. In this case, the position of the GW 460 is determined concurrently. The order of the position determination of the GW 460 and the position determination of the SN 470 is irrelevant.

In a case where the position determination of the SN 470 ends, the SPC 430 sends an SUPL END message to the GW 460 to end an SUPL session at step 417. Here, the SUPL END message includes a session-ID.

After completing the end of the SUPL session, the SPC 430 forwards the determined position information of the SN 470 to the SLC 420 through internal communications at step 419.

Upon receiving the position information of the SN 470, the SLC 420 sends an MLP SLIA message to the SUPL agent (not shown) to forward the position information of the SN 470 at step 421.

Figure 5:
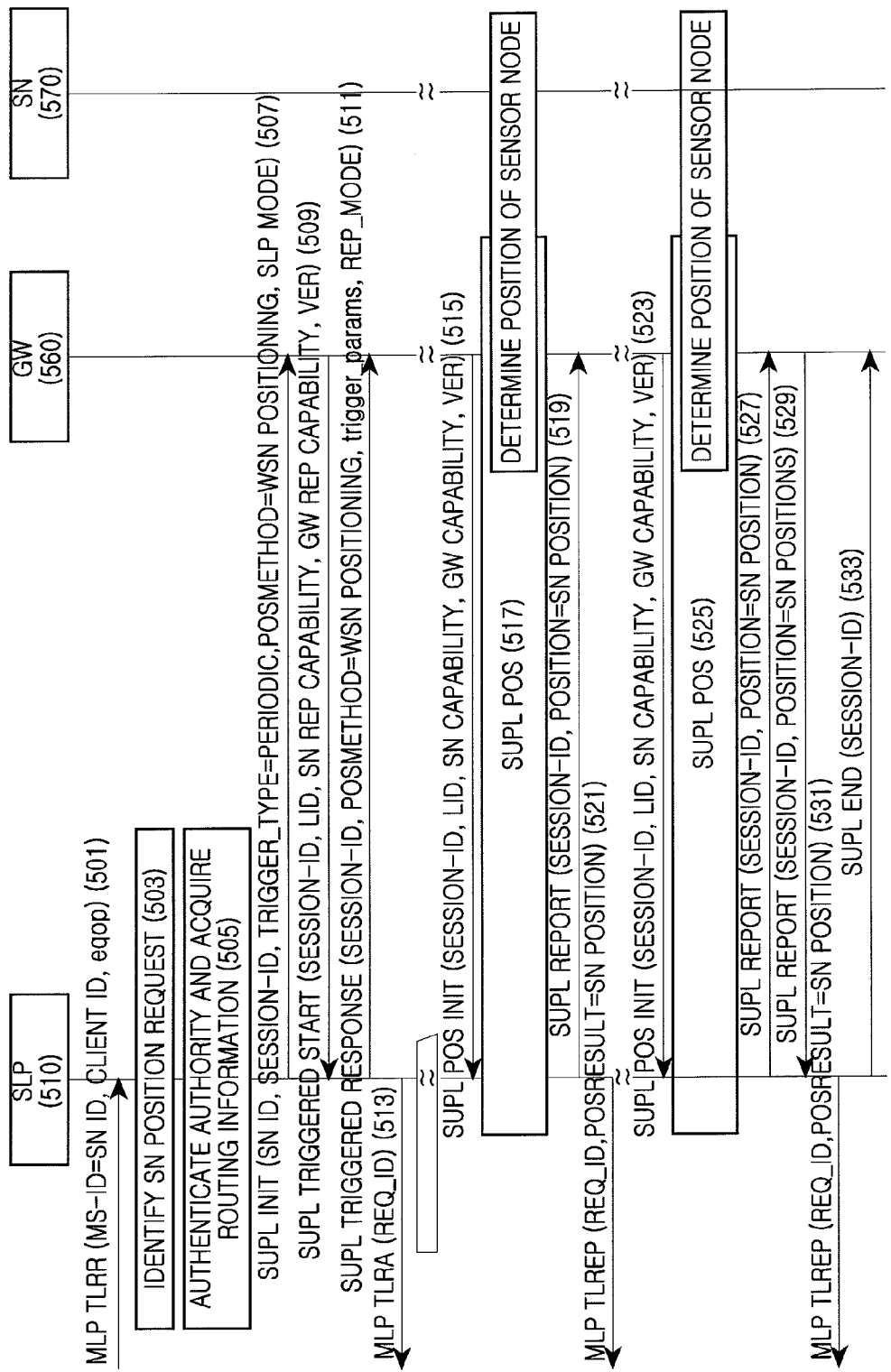
FIG. 5 is a signal flow diagram illustrating a periodic triggered service procedure in a network-initiated proxy mode in a location service based system according to a fourth exemplary embodiment of the present invention.

FIG. 5 is a signal flow diagram illustrating a periodic triggered service procedure in a network-initiated proxy mode in a location service based system according to a fourth exemplary embodiment of the present invention. The periodic triggered service is a service for periodically acquiring a position of a sensor node.

Referring to FIG. 5, an SUPL agent (not shown), which intends to provide various services using position information of an SN 570 in a network performing communication based on an SUPL protocol, sends a Mobile Location Protocol Triggered Location Reporting Request (MLP TLRR) message to an SLP 510 to request a periodic triggered service about a current position of the SN 570 at step 501. Here, the MLP TLRR message includes an SN ID as a terminal identifier (MS-ID) that is a target, a client identifier (client ID) as an identifier of the SUPL agent (not shown) having requested the position information of the SN 570, and an EQOP of the requested position information.

Upon receiving the MLP TLRR message, the SLP 510 confirms the terminal identifier (MS-ID) within the received MLP TLRR message and, in a case where the confirmed terminal identifier (MS-ID) is the SN ID, the SLP 510 determines that the received MLP TLRR message is a message requesting the position information of the SN 570 at step 503.

Upon determining that the received MLP TLRR message is the message requesting the position information of the SN 570, the SLP 510 interworks with a PCE (not shown) and acquires an authority authentication result of the SUPL agent (not shown) for position determination of the SN 570, and interworks with an LRS (not shown) and acquires routing information of the SN 570 at step 505. In other words, the SLP 510 sends a request for authentication on an authority of the SUPL agent (not shown) for the position determination of the SN 570 to the PCE (not shown) through a PCP, and receives the authority authentication result from the PCE (not shown). Also, the SLP 510 sends a routing information request message to the LRS (not shown) to request the routing information of the SN 570, and receives a routing information response message from the LRS (not shown) to acquire the routing information of the SN 570. Here, the routing information request message includes the SN ID, and the EQOP requested from the SUPL agent (not shown), and the routing information response message includes a GW ID mapped to the SN ID, and capability information of the SN 570 and a GW 560. Here, the capability information of the GW 560 includes information on a position determination method supportable by the GW 560 and the like. Also, the capability information of the SN 570 includes information on a position determination method supportable by the SN 570, a relative distance of the SN 570 from the GW 560, and the like.

Upon acquiring the routing information of the SN 570, the SLP 510 sends an SUPL INIT message to the GW 560 mapped to the SN 570 to request periodic position determination initiation for the SN 570 at step 507. Here, the SUPL INIT message includes information on an SN ID, a session identifier (session-ID), a trigger type, a positioning method (posmethod), and an SLP mode. The trigger type represents a type of a triggered service. The type of the triggered service is a periodic triggered service, an area event based triggered service, and the like. The positioning method (posmethod) can include, for example, a WSN positioning method. Here, the SLP mode represents a mode in which position determination is carried out and is, for example, one of a proxy mode and a non-proxy mode.

Upon receiving the SUPL INIT message, the GW 560 in place of the SN 570 sends an SUPL TRIGGERED START message to the SLP 510 to provide reporting capability information at step 509. Here, the SUPL TRIGGERED START message includes information on a session identifier (session-ID), a location identifier (LID) for identifying a currently located network, a reporting capability of the SN 570, a reporting capability of the GW 560, and a version (VER). Here, the reporting capability information can include information about whether it can report determined position information at the same time.

Upon receiving the SUPL TRIGGERED START message, the SLP 510 sends an SUPL TRIGGERED RESPONSE message to the GW 560 to provide a parameter for periodic position determination at step 511. Here, the SUPL TRIG- GERED RESPONSE message includes information on a session identifier (session-ID), a positioning method (posmethod), a trigger parameter for periodic position determination, and a reporting mode.

Also, the SLP 510 generates request identifier information, and sends a Mobile Location Protocol Triggered Location Reporting Answer (MLP TLRA) message to the SUPL agent (not shown) to forward the request identifier information at step 513.

Upon receiving the SUPL TRIGGERED RESPONSE message, the GW 560 in place of the SN 570 checks a reporting period of the periodic triggered service, and the GW 560 in place of the SN 570 sends an SUPL POS INIT message to the SPL 510 in a corresponding reporting period to initiate position determination at step 515. Here, the SUPL POS INIT message includes information on a session identifier (session-ID), a location identifier (LID) for identifying a currently located network, a capability of the SN 570, a capability of the GW 560, and a version (VERr).

Upon receiving the SUPL POS INIT message, the SLP 510 interworks with the GW 560 and performs an SUPL POS procedure, thereby determining a position of the SN 570 at step 517. At this time, there can be a case where a position of the GW 560 should be first determined in order to determine the position of the SN 570. In this case, the position of the GW 560 is determined concurrently. The order of the position determination of the GW 560 and the position determination of the SN 570 is irrelevant.

In a case where the position determination of the SN 570 ends, the SLP 510 sends an SUPL REPORT message to the GW 560 to report the determined position information of the SN 570 at step 519. Here, the SUPL REPORT message includes a session identifier (session-ID), and the determined position information of the SN 570.

Also, the SLP 510 sends a Mobile Location Protocol Triggered Location Report (MLP TLREP) message to the SUPL agent (not shown) to forward a request identifier and the determined position information of the SN 570 at step 521.

After that, in a corresponding reporting period of a periodic triggered service, the GW 560 and SLP 510 repeatedly perform the process of steps 515, 517, 519, and 521 at steps 523, 525, 527, and 531. Here, in the last reporting period, the GW 560 sends an SUPL REPORT message to the SLP 510 and, at the same time, reports position information that is acquired from the SLP 510 in the meantime at step 529. Here, the SUPL REPORT message includes a session identifier (session-ID), and the acquired position information of the SN 570.

After ending the periodic triggered service as receiving the SUPL REPORT message, the SLP 510 sends an SUPL END message to the GW 560 to end an SUPL session at step 533. Here, the SUPL END message includes session-id information.

Figure 6:
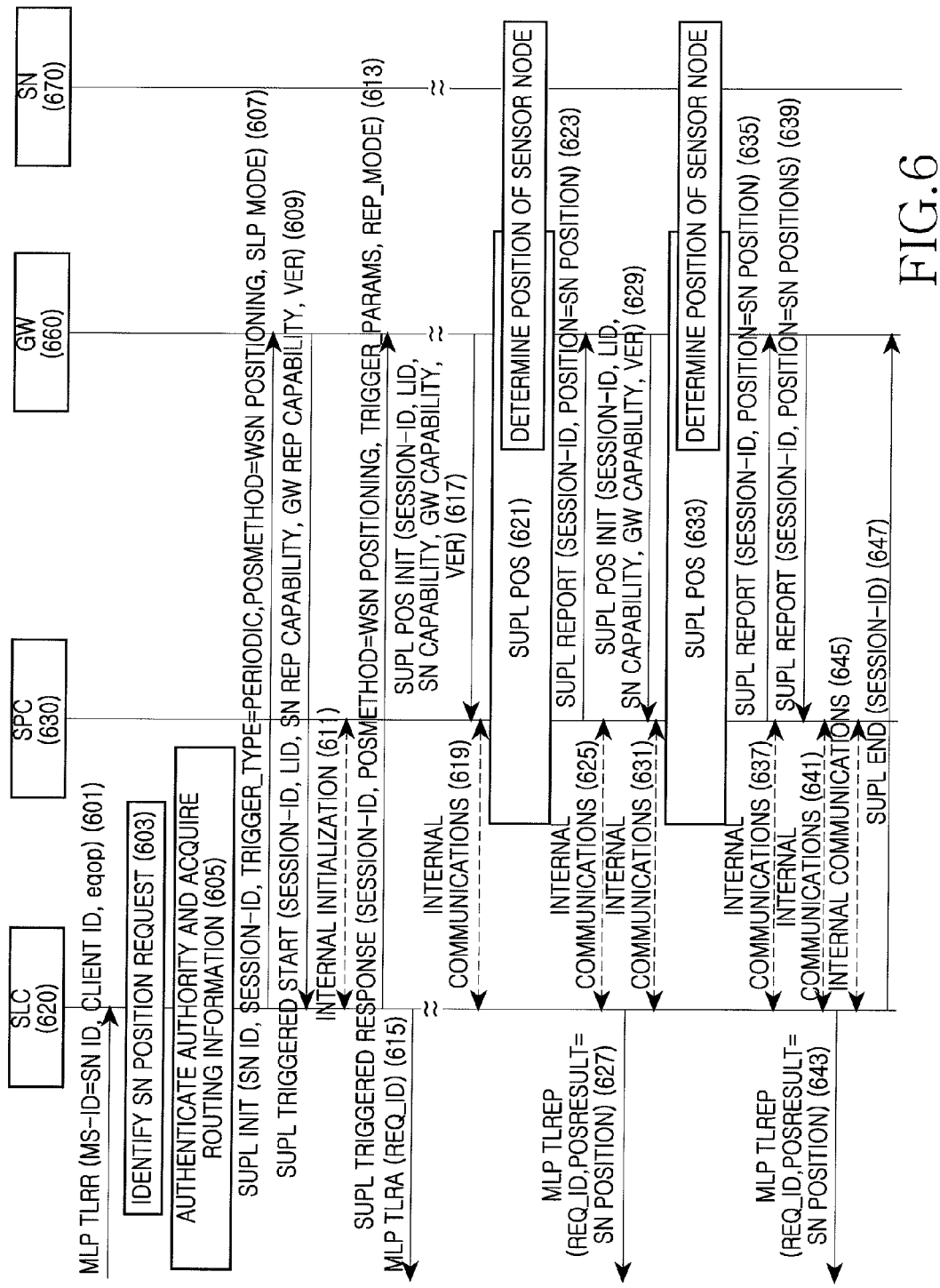
FIG. 6 is a signal flow diagram illustrating a periodic triggered service procedure in a network-initiated non-proxy mode in a location service based system according to a fifth exemplary embodiment of the present invention.

FIG. 6 is a signal flow diagram illustrating a periodic triggered service procedure in a network-initiated non-proxy mode in a location service based system according to a fifth exemplary embodiment of the present invention.

Referring to FIG. 6, an SUPL agent (not shown), which intends to provide various services using position information of an SN 670 in a network performing communication based on an SUPL protocol, sends an MLP TLRR message to an SLC 620 to request a periodic triggered service about a current position of the SN 670 at step 601. Here, the MLP TLRR message includes an SN ID as a terminal identifier (MS-ID) that is a target, a client identifier (client ID) as an identifier of the SUPL agent (not shown) having requested for the position information of the SN 670, and an EQOP of the requested position information.

Upon receiving the MLP TLRR message, the SLC 620 confirms the terminal identifier (MS-ID) within the received MLP TLRR message and, in a case where the confirmed terminal identifier (MS-ID) is the SN ID, the SLC 620 determines that the received MLP TLRR message is a message requesting the position information of the SN 670 at step 603.

Upon determining that the received MLP TLRR message is the message requesting the position information of the SN 670, the SLC 620 interworks with a PCE (not shown) and acquires an authority authentication result of the SUPL agent (not shown) for position determination of the SN 670, and interworks with an LRS (not shown) and acquires routing information of the SN 670 at step 605. In other words, the SLC 620 sends a request for authentication on an authority of the SUPL agent (not shown) for the position determination of the SN 670 to the PCE (not shown) through a PCP, and receives the authority authentication result from the PCE (not shown). Also, the SLC 620 sends a routing information request message to the LRS (not shown) to request the routing information of the SN 670, and receives a routing information response message from the LRS (not shown) to acquire the routing information of the SN 670. Here, the routing information request message includes the SN ID, and the EQOP requested from the SUPL agent (not shown), and the routing information response message includes a GW ID mapped to the SN ID, and capability information of the SN 670 and a GW 660. Here, the capability information of the GW 660 includes information on a position determination method supportable by the GW 660 and the like. Also, the capability information of the SN 670 includes information on a position determination method supportable by the SN 670, a relative distance of the SN 670 from the GW 660, and the like.

Upon acquiring the routing information of the SN 670, the SLC 620 sends an SUPL INIT message to the GW 660 mapped to the SN 670 to request periodic position determination initiation for the SN 670 at step 607. Here, the SUPL INIT message includes information on an SN ID, a session identifier (session-ID), a trigger type, a positioning method (posmethod), and an SLP mode. The trigger type represents a type of a triggered service. The type of the triggered service is a periodic triggered service, an area event based triggered service and the like. The positioning method (posmethod) can include, for example, a WSN positioning method. Here, the SLP mode represents a mode in which position determination is carried out and is, for example, one of a proxy mode and a non-proxy mode.

Upon receiving the SUPL INIT message, the GW 660 in place of the SN 670 sends an SUPL TRIGGERED START message to the SLC 620 to provide reporting capability information at step 609. Here, the SUPL TRIGGERED START message includes information on a session identifier (session-ID), a location identifier (LID) for identifying a currently located network, a reporting capability of the SN 670, a reporting capability of the GW 660, and a version (VER). Here, the reporting capability information can include information about whether it can report determined position information at the same time.

Upon receiving the SUPL TRIGGERED START message, the SLC 620 initiates internal communications and forwards the received MLP TLRR message to an SPC 630 at step 611.

Also, the SLC 620 sends an SUPL TRIGGERED RESPONSE message to the GW 660 to provide a parameter for periodic position determination at step 613. Here, the SUPL TRIGGERED RESPONSE message includes information on a session identifier (session-ID), a positioning method (posmethod), a trigger parameter for periodic position determination, and a reporting mode.

Also, the SLC 620 generates request identifier information, and sends an MLP TLRA message to the SUPL agent (not shown) to forward the request identifier information at step 615.

Upon receiving the SUPL TRIGGERED RESPONSE message, the GW 660 in place of the SN 670 checks a reporting period of the periodic triggered service, and the GW 660 in place of the SN 670 sends an SUPL POS INIT message to the SPC 630 in a corresponding reporting period to initiate position determination at step 617. Here, the SUPL POS INIT message includes information on a session identifier (session-ID), a location identifier (LID) for identifying a currently located network, a capability of the SN 670, a capability of the GW 660, and a version (VER).

Upon receiving the SUPL POS INIT message, the SPC 630 forwards the received SUPL POS INIT message to the SLC 620 through internal communications at step 619.

Also, the SPC 630 interworks with the GW 660 and performs an SUPL POS procedure, thereby determining a position of the SN 670 at step 621. At this time, there can be a case where a position of the GW 660 should be first determined in order to determine the position of the SN 670. In this case, the position of the GW 660 is determined concurrently. The order of the position determination of the GW 660 and the position determination of the SN 670 is irrelevant.

In a case where the position determination of the SN 670 ends, the SPC 630 sends an SUPL REPORT message to the GW 660 to report the determined position information of the SN 670 at step 623. Here, the SUPL REPORT message includes a session identifier (session-ID), and the determined position information of the SN 670.

Also, the SPC 630 forwards the determined position information of the SN 670 to the SLC 620 through internal communications at step 625.

Upon acquiring the position information of the SN 670, the SLC 620 sends an MLP TLREP message to the SUPL agent (not shown) to forward a request identifier and the determined position information of the SN 670 at step 627.

After that, in a corresponding reporting period of a periodic triggered service, the GW 660, SLC 620, and SPC 630 repeatedly perform the process of steps 617, 619, 621, 623, 625, and 627 at steps 629, 631, 633, 635, 637, and 643. Here, in the last reporting period, the GW 660 sends an SUPL REPORT message to the SPC 630 and, at the same time, reports position information that is acquired from the SLC 620 in the meantime at step 639. Here, the SUPL REPORT message includes a session identifier (session-ID), and the acquired position information of the SN 670. At this time, the SPC 630 forwards position information of the SN 670 to the SLC 620 through internal communications at step 641.

After ending the periodic triggered service as receiving the position information of the SN 670, the SLC 620 ends internal communications with the SPC 630 at step 645, and sends an SUPL END message to the GW 660 to end an SUPL session at step 647. Here, the SUPL END message includes session-id information.

Figure 7:
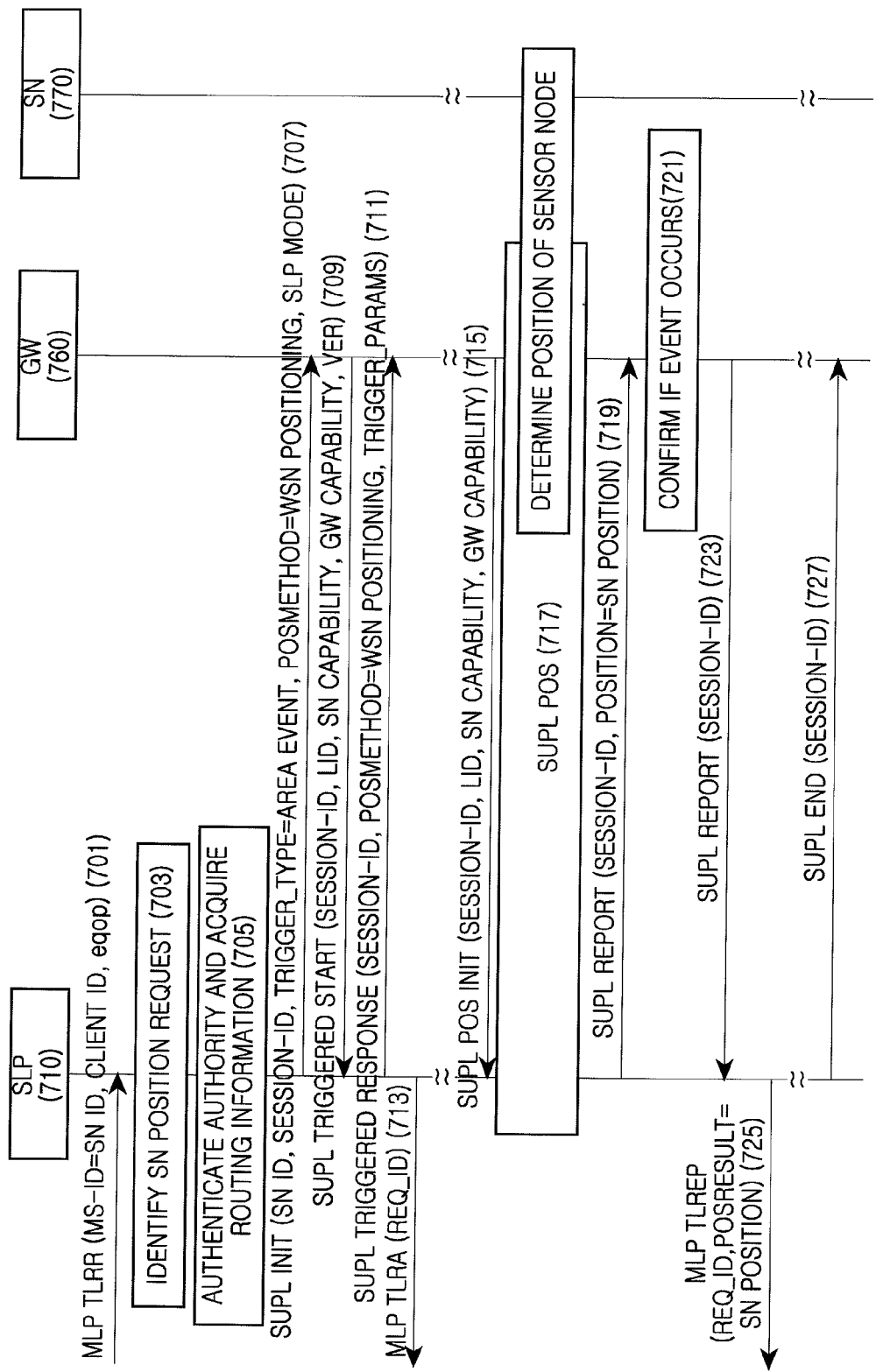
FIG. 7 is a signal flow diagram illustrating an area event based triggered service procedure in a network-initiated proxy mode in a location service based system according to a sixth exemplary embodiment of the present invention.

FIG. 7 is a signal flow diagram illustrating an area event based triggered service procedure in a network-initiated proxy mode in a location service based system according to a sixth exemplary embodiment of the present invention.

Referring to FIG. 7, an SUPL agent (not shown), which intends to provide various services using position information of an SN 770 in a network performing communication based on an SUPL protocol, sends an MLP TLRR message to an SLP 710 to request an area event based triggered service about a current position of the SN 770 at step 701. Here, the MLP TLRR message includes an SN ID as a terminal identifier (MS-ID) that is a target, a client identifier (client ID) as an identifier of the SUPL agent (not shown) having requested for the position information of the SN 770, and an EQOP of the requested position information.

Upon receiving the MLP TLRR message, the SLP 710 confirms the terminal identifier (MS-ID) within the received MLP TLRR message and, in a case where the confirmed terminal identifier (MS-ID) is the SN ID, the SLP 710 determines that the received MLP TLRR message is a message requesting the position information of the SN 770 at step 703.

Upon determining that the received MLP TLRR message is the message requesting the position information of the SN 770, the SLP 710 interworks with a PCE (not shown) and acquires an authority authentication result of the SUPL agent (not shown) for position determination of the SN 770, and interworks with an LRS (not shown) and acquires routing information of the SN 770 at step 705. In other words, the SLP 710 sends a request for authentication on an authority of the SUPL agent (not shown) for the position determination of the SN 770 to the PCE (not shown) through a PCP, and receives the authority authentication result from the PCE (not shown). Also, the SLP 710 sends a routing information request message to the LRS (not shown) to request the routing information of the SN 770, and receives a routing information response message from the LRS (not shown) to acquire the routing information of the SN 770. Here, the routing information request message includes the SN ID, and the EQOP requested from the SUPL agent (not shown), and the routing information response message includes a GW ID mapped to the SN ID, and capability information of the SN 770 and a GW 760. Here, the capability information of the GW 760 includes information on a position determination method supportable by the GW 760 and the like. Also, the capability information of the SN 770 includes information on a position determination method supportable by the SN 770, a relative distance of the SN 770 from the GW 760, and the like.

Acquiring the routing information of the SN 770, the SLP 710 sends an SUPL INIT message to the GW 760 mapped to the SN 770 to request area event based position determination initiation for the SN 770 at step 707. Here, the SUPL INIT message includes information on an SN ID, a session identifier (session-ID), a trigger type, a positioning method (posmethod), and an SLP mode. The trigger type represents a type of a triggered service. The type of the triggered service is a periodic triggered service, an area event based triggered service, and the like. The positioning method (posmethod) can include, for example, a WSN positioning method. Here, the SLP mode represents a mode in which position determination is carried out and is, for example, one of a proxy mode and a non-proxy mode.

Upon receiving the SUPL INIT message, the GW 760 in place of the SN 770 sends an SUPL TRIGGERED START message to the SLP 710 to provide reporting capability information at step 709. Here, the SUPL TRIGGERED START message includes information on a session identifier (session-ID), a location identifier (LID) for identifying a currently located network, a capability of the SN 770, a capability of the GW 760, and a version (VER).

Upon receiving the SUPL TRIGGERED START message, the SLP 710 sends an SUPL TRIGGERED RESPONSE message to the GW 760 to provide a parameter for area event based position determination at step 711. Here, the SUPL TRIGGERED RESPONSE message includes information on a session identifier (session-ID), a positioning method (posmethod), and a trigger parameter for area event based position determination.

Also, the SLP 710 generates request identifier information, and sends an MLP TLRA message to the SUPL agent (not shown) to forward the request identifier information at step 713.

Upon receiving the SUPL TRIGGERED RESPONSE message, the GW 760 in place of the SN 770 sends an SUPL POS INIT message to the SLP 710 to initiate position determination at step 715. Here, the SUPL POS INIT message includes information on a session identifier (session-ID), a location identifier (LID) for identifying a currently located network, a capability of the SN 770, and a capability of the GW 760.

Upon receiving the SUPL POS INIT message, the SLP 710 interworks with the GW 760 and performs an SUPL POS procedure, thereby determining a position of the SN 770 at step 717. At this time, there can be a case where a position of the GW 760 should be first determined in order to determine the position of the SN 770. In this case, the position of the GW 760 is determined concurrently. The order of the position determination of the GW 760 and the position determination of the SN 770 is irrelevant.

In a case where the position determination of the SN 770 ends, the SLP 710 sends an SUPL REPORT message to the GW 760 to report the determined position information of the SN 770 at step 719. Here, the SUPL REPORT message includes a session identifier (session-ID), and the determined position information of the SN 770.

Upon receiving the SUPL REPORT message, the GW 760 confirms if an area-based event for position information occurs at step 721 and, in a case where the event occurs, the GW 760 sends an SUPL REPORT message to the SLP 710 to report that the event has occurred at step 723.

Upon receiving the SUPL REPORT message, the SLP 710 sends an MLP TLREP message to the SUPL agent (not shown) to forward a request identifier and the determined position information of the SN 770 at step 725.

Also, after ending the area event based triggered service, the SLP 710 sends an SUPL END message to the GW 760 to end an SUPL session at step 727. Here, the SUPL END message includes session-id information.

Figure 8:
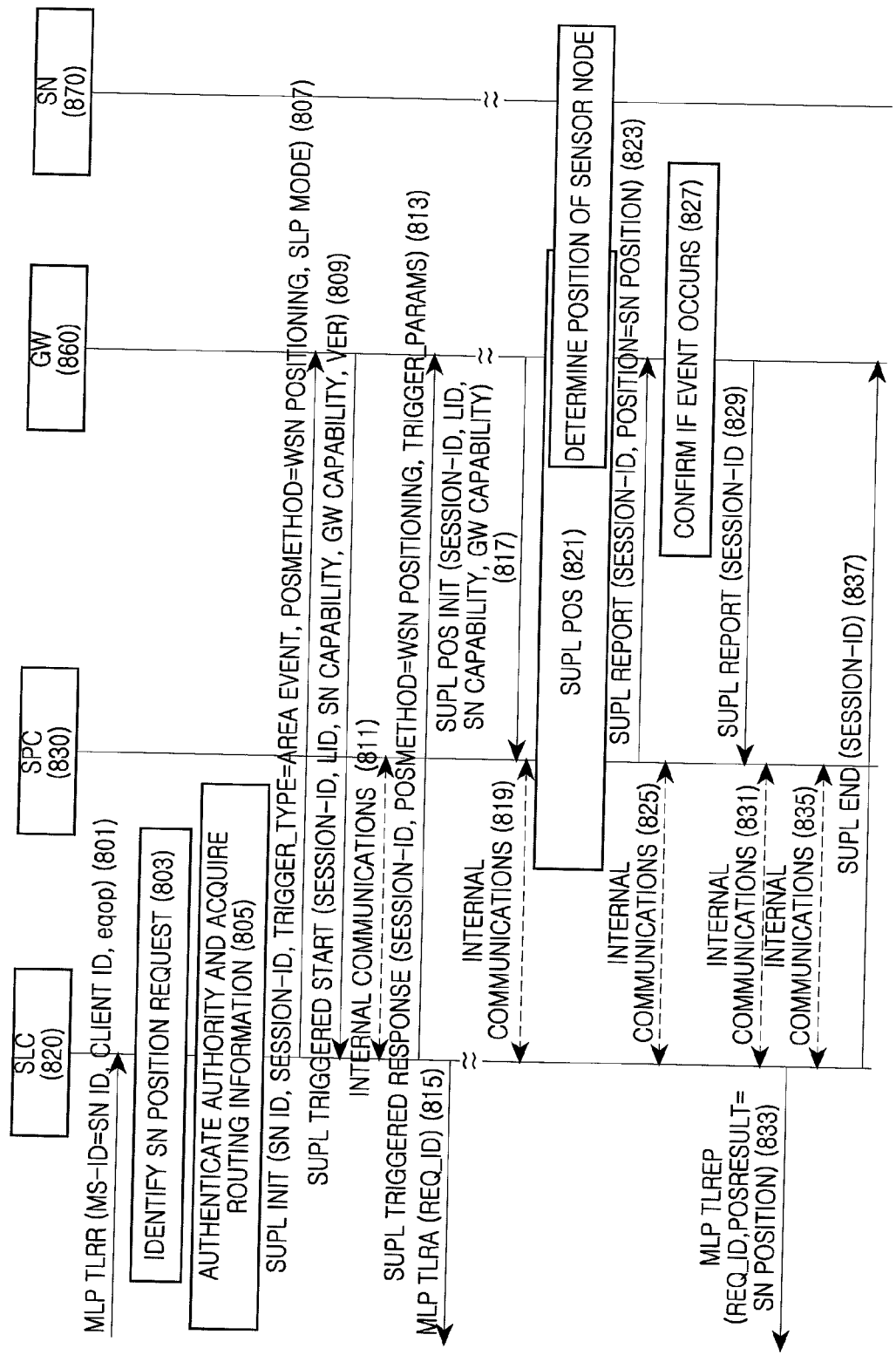
FIG. 8 is a signal flow diagram illustrating an area event based triggered service procedure in a network-initiated non-proxy mode in a location service based system according to a seventh exemplary embodiment of the present invention.

FIG. 8 is a signal flow diagram illustrating an area event based triggered service procedure in a network-initiated non-proxy mode in a location service based system according to an exemplary embodiment of the present invention.

Referring to FIG. 8, an SUPL agent (not shown), which intends to provide various services using position information of an SN 870 in a network performing communication based on an SUPL protocol, sends an MLP TLRR message to an SLC 820 to request an area event based triggered service about a current position of the SN 870 at step 801. Here, the MLP TLRR message includes an SN ID as a terminal identifier (MS-ID) that is a target, a client identifier (client ID) as an identifier of the SUPL agent (not shown) having requested for the position information of the SN 870, and an EQOP of the requested position information.

Upon receiving the MLP TLRR message, the SLC 820 confirms the terminal identifier (MS-ID) within the received MLP TLRR message and, in a case where the confirmed terminal identifier (MS-ID) is the SN ID, the SLC 820 determines that the received MLP TLRR message is a message requesting the position information of the SN 870 at step 803.

Upon determining that the received MLP TLRR message is the message requesting the position information of the SN 870, the SLC 820 interworks with a PCE (not shown) and acquires an authority authentication result of the SUPL agent (not shown) for position determination of the SN 870, and interworks with an LRS (not shown) and acquires routing information of the SN 870 at step 805. In other words, the SLC 820 sends a request for authentication on an authority of the SUPL agent (not shown) for the position determination of the SN 870 to the PCE (not shown) through a PCP, and receives the authority authentication result from the PCE (not shown). Also, the SLC 820 sends a routing information request message to the LRS (not shown) to request the routing information of the SN 870, and receives a routing information response message from the LRS (not shown) to acquire the routing information of the SN 870. Here, the routing information request message includes the SN ID, and the EQOP requested from the SUPL agent (not shown), and the routing information response message includes a GW ID mapped to the SN ID, and capability information of the SN 870 and a GW 860. Here, the capability information of the GW 860 includes information on a position determination method supportable by the GW 860 and the like. Also, the capability information of the SN 870 includes information on a position determination method supportable by the SN 870, a relative distance of the SN 870 from the GW 860, and the like.

Upon acquiring the routing information of the SN 870, the SLC 820 sends an SUPL INIT message to the GW 860 mapped to the SN 870 to request area event based position determination initiation for the SN 870 at step 807. Here, the SUPL INIT message includes information on an SN ID, a session identifier (session-ID), a trigger type, a positioning method (posmethod), and an SLP mode. The trigger type represents a type of a triggered service. The type of the triggered service is a periodic triggered service, an area event based triggered service and the like. The positioning method (posmethod) can include, for example, a WSN positioning method. Here, the SLP mode represents a mode in which position determination is carried out and is, for example, one of a proxy mode and a non-proxy mode.

Upon receiving the SUPL INIT message, the GW 860 in place of the SN 870 sends an SUPL TRIGGERED START message to the SLC 820 to provide reporting capability information at step 809. Here, the SUPL TRIGGERED START message includes information on a session identifier (session-ID), a location identifier (LID) for identifying a currently located network, a capability of the SN 870, a capability of the GW 860, and a version (VER).

Upon receiving the SUPL TRIGGERED START message, the SLC 820 initiates internal communications and forwards the received MLP TLRR message to the SPC 830 at step 811.

Also, upon receiving the SUPL TRIGGERED START message, the SLC 820 sends an SUPL TRIGGERED RESPONSE message to the GW 860 to provide a parameter for area event based position determination at step 813. Here, the SUPL TRIGGERED RESPONSE message includes information on a session identifier (session-ID), a positioning method (posmethod), and a trigger parameter for area event based position determination.

Also, the SLC 820 generates request identifier information, and sends an MLP TLRA message to the SUPL agent (not shown) to forward the request identifier information at step 815.

Upon receiving the SUPL TRIGGERED RESPONSE message, the GW 860 in place of the SN 870 sends an SUPL POS INIT message to the SPC 830 to initiate position determination at step 817. Here, the SUPL POS INIT message includes information on a session identifier (session-ID), a location identifier (LID) for identifying a currently located network, a capability of the SN 870, and a capability of the GW 860.

Upon receiving the SUPL POS INIT message, the SPC 830 forwards the received SUPL POS INIT message to the SLC 820 through internal communications at step 819.

Also, the SPC 830 interworks with the GW 860 and performs an SUPL POS procedure, thereby determining a position of the SN 870 at step 821. At this time, there can be a case where a position of the GW 860 should be first determined in order to determine the position of the SN 870. In this case, the position of the GW 860 is determined concurrently. The order of the position determination of the GW 860 and the position determination of the SN 870 is irrelevant.

In a case where the position determination of the SN 870 ends, the SPC 830 sends an SUPL REPORT message to the GW 860 to report the determined position information of the SN 870 at step 823. Here, the SUPL REPORT message includes a session identifier (session-ID), and the determined position information of the SN 870.

Also, the SPC 830 forwards an SUPL REPORT message to the SLC 820 through internal communications at step 825.

Upon receiving the SUPL REPORT message, the GW 860 confirms if an area-based event for position information occurs at step 827 and, in a case where the event occurs, the GW 860 sends an SUPL REPORT message to the SPC 830 to report that the event has occurred at step 829.

Upon receiving the SUPL REPORT message, the SPC 830 forwards the received SUPL REPORT message to the SLC 820 through internal communications at step 831.

Upon receiving the SUPL REPORT message, the SLC 820 sends an MLP TLREP message to the SUPL agent (not shown) to forward a request identifier and the determined position information of the SN 870 at step 833.

After ending the area event based triggered service, the SLC 820 ends internal communications with the SPC 830 at step 835, and sends an SUPL END message to the GW 860 to end an SUPL session at step 837. Here, the SUPL END message includes session-id information.

Figure 9:
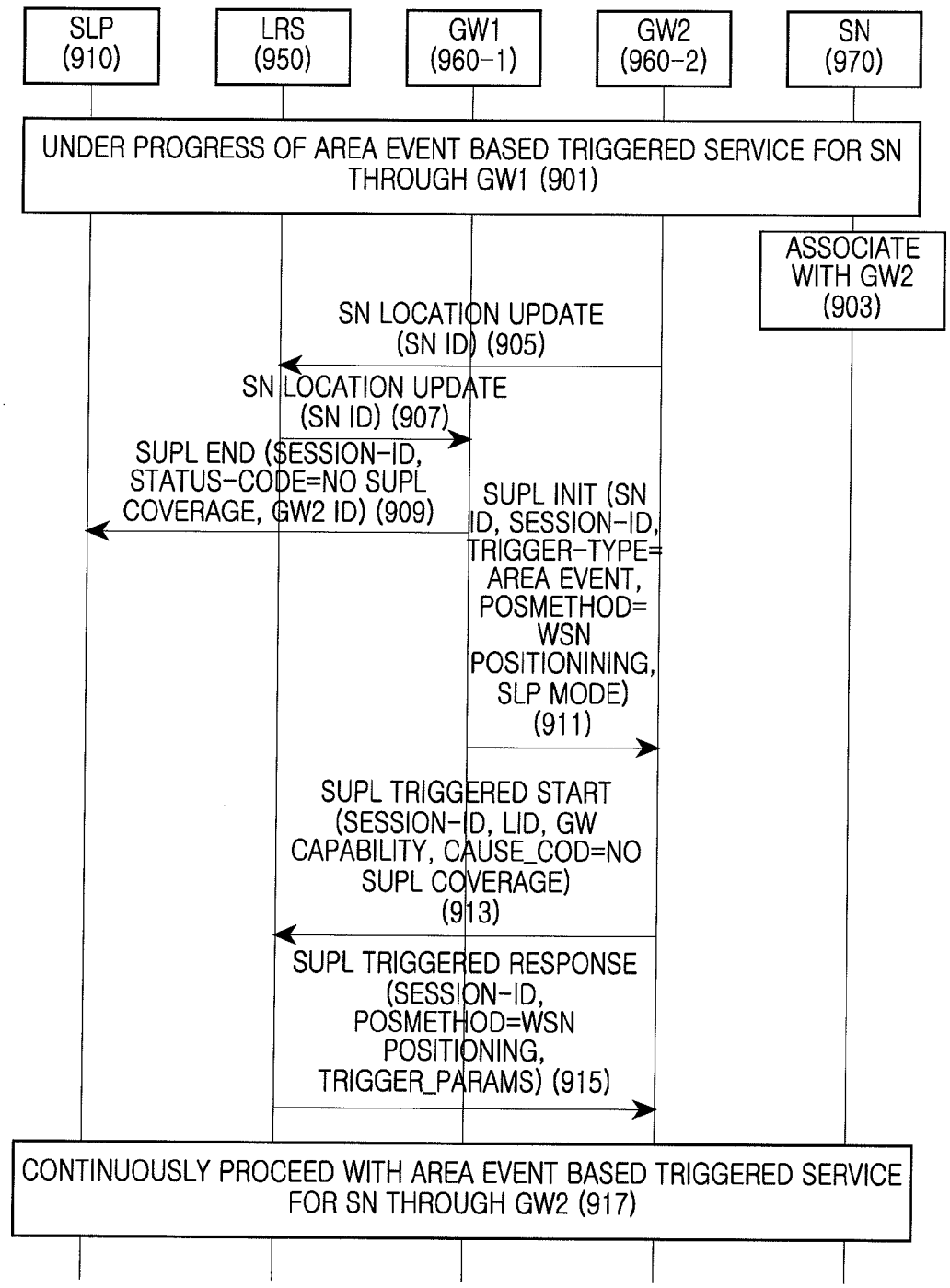
FIG. 9 is a signal flow diagram illustrating an area event based triggered service procedure in a case where an SN moves to a second GateWay (GW2) while carrying out an area event based triggered service at a first GateWay (GW1), in a network-initiated proxy mode in a location service based system according to an eighth exemplary embodiment of the present invention.

FIG. 9 is a signal flow diagram illustrating an area event based triggered service procedure in a case where an SN moves to a second GateWay (GW2) while carrying out an area event based triggered service at a first GateWay (GW1), in a network-initiated proxy mode in a location service based system according to an eighth exemplary embodiment of the present invention. FIG. 9 describes, for example, an area event based triggered service but it is also identically applicable to a periodic triggered service.

Referring to FIG. 9, while an SLP 910 performs an area event based triggered service for an SN 970 through a GW1 960-1 at step 901, the SN 970 is associated with a GW2 960-2 at step 903 in a case where the SN 970 moves to an area of the GW2 960-2 from the GW1 960-1.

The GW2 960-2 sends an SN Location Update message to an LRS 950 to report that the SN 970 has been associated with the GW2 960-2 itself at step 905. Here, the SN Location Update message includes an SN ID.

Upon receiving the SN Location Update message, the LRS 950 forwards the received SN Location Update message to the GW1 960-1 to report that the SN 970 has been associated with the GW2 960-2 at step 907.

Upon receiving the SN Location Update message, the GW1 960-1 ends a corresponding SUPL session, and sends an SUPL END message to the SLP 910 to report that the SN 970 has been associated with the GW2 960-2 at step 909. Here, the SUPL END message includes a session identifier (session-ID), a status code representing an error status, and ID information of the GW2 960-2.

Also, the GW1 960-1 sends an SUPL INIT message to the GW2 960-2 to request area event based position determination initiation for the SN 970 at step 911. Here, the SUPL INIT message includes information on an SN ID, a session identifier (session-ID), a trigger type, a positioning method (posmethod), and an SLP mode.

Upon receiving the SUPL INIT message, the GW2 960-2 sends an SUPL TRIGGERED START message to the LRS 950 to provide reporting capability information at step 913. Here, the SUPL TRIGGERED START message includes information on a session identifier (session-ID), a location identifier (LID) for identifying a currently located network, a capability of the GW 860, and a cause code representing an error cause.

Upon receiving the SUPL TRIGGERED START message, the LRS 950 sends an SUPL TRIGGERED RESPONSE message to the GW2 960-2 to provide a parameter for area event based position determination at step 915. Here, the SUPL TRIGGERED RESPONSE message includes information on a session identifier (session-ID), a positioning method (posmethod), and a trigger parameter for area event based position determination.

After that, the SLP 910 continuously proceeds with an area event based triggered service for the SN 970 through the GW2 960-2 at step 917.

Figure 10:
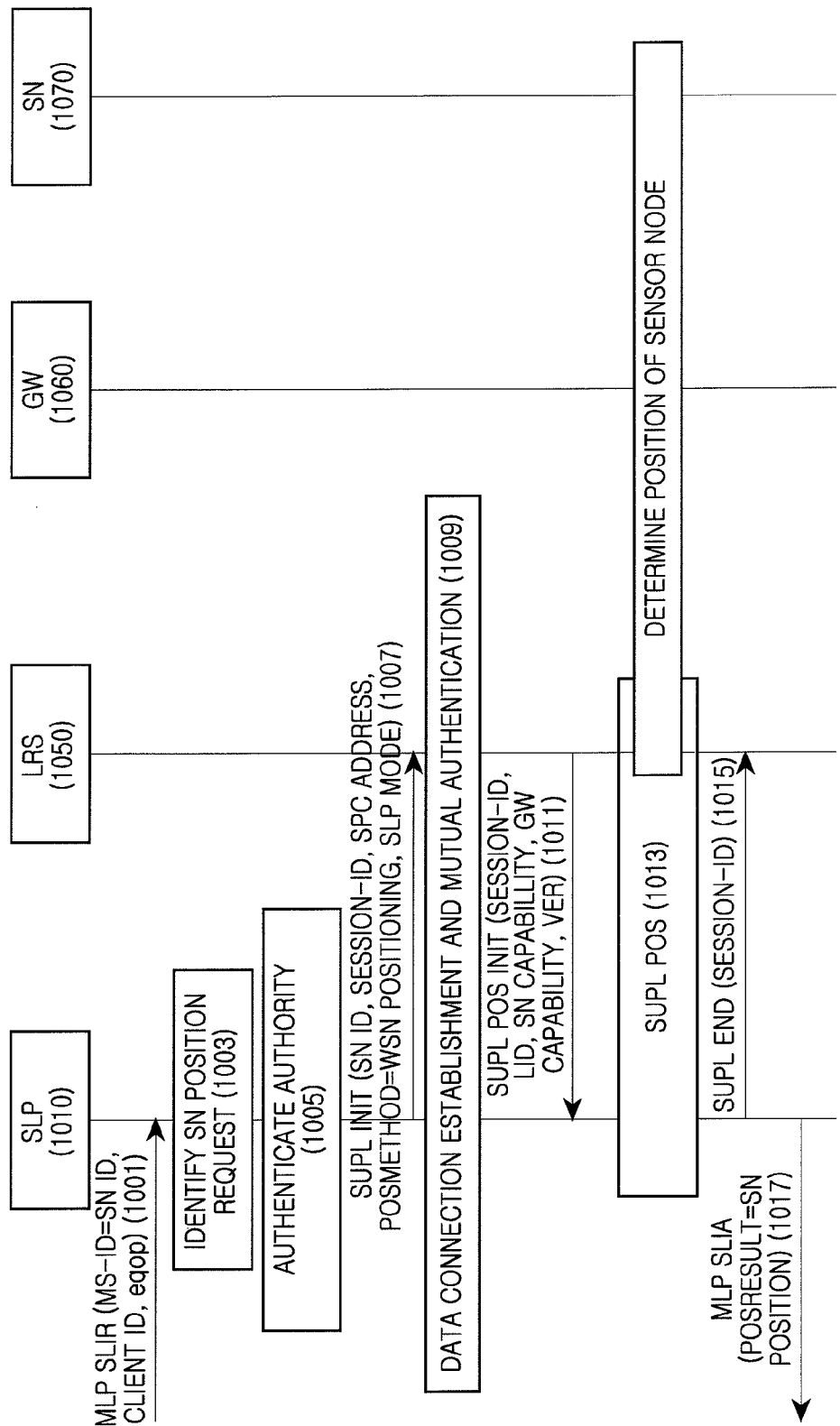
FIG. 10 is a signal flow diagram illustrating a service procedure in a case where an LRS performs position determination in place of an SN, in a network-initiated proxy mode in a location service based system according to a ninth exemplary embodiment of the present invention.

FIG. 10 is a signal flow diagram illustrating a service procedure in a case where an LRS performs position determination in place of an SN, in a network-initiated proxy mode in a location service based system according to a ninth exemplary embodiment of the present invention. FIG. 10 describes, for example, an immediate service but it is also identically applicable to a triggered service.

Referring to FIG. 10, an SUPL agent (not shown), which intends to provide various services using position information of an SN 1070 in a network performing communication based on an SUPL protocol, sends an MLP SLIR message to an SLP 1010 to request an immediate service about a current position of the SN 1070 at step 1001. Here, the MLP SLIR message includes an SN ID as a terminal identifier (MS-ID) that is a target, a client identifier (client ID) as an identifier of the SUPL agent (not shown) having requested for the position information of the SN 1070, and an EQOP of the requested position information.

Upon receiving the MLP SLIR message, the SLP 1010 confirms the terminal identifier (MS-ID) within the received MLP SLIR message and, in a case where the confirmed terminal identifier (MS-ID) is the SN ID, the SLP 1010 determines that the received MLP SLIR message is a message requesting the position information of the SN 1070 at step 1003.

Upon determining that the received MLP SLIR message is the message requesting the position information of the SN 1070, the SLP 1010 interworks with a PCE (not shown) and acquires an authority authentication result of the SUPL agent (not shown) for position determination of the SN 1070 at step 1005. In other words, the SLP 1010 sends a request for authentication on an authority of the SUPL agent (not shown) for the position determination of the SN 1070 to the PCE (not shown) through a PCP, and receives the authority authentication result from the PCE (not shown). Here, in a case where the LRS 1050 performs position determination in place of the SN 1070, the SLP 1010 does not need to manage routing information of the SN 1070. So, a routing information acquisition procedure through interworking with the LRS 1050 is not required.

Upon receiving the authority authentication result, the SLP 1010 sends an SUPL INIT message to the LRS 1050 to make a request for position determination initiation for the SN 1070 at step 1007. Here, the SUPL INIT message includes information on an SN ID, a session identifier (session-ID), an SPC address, a positioning method (posmethod), and an SLP mode. For example, the positioning method (posmethod) can include a WSN positioning method. Here, the SLP mode represents a mode in which position determination is carried out and is, for example, one of a proxy mode and a non-proxy mode.

Upon receiving the SUPL INIT message, the LRS 1050 interworks with the SLP 1010 and establishes a data connection, and performs mutual authentication at step 1009.

After completing the data connection establishment and the mutual authentication, the LRS 1050 in place of the SN 1070 sends an SUPL POS INIT message to the SLP 1010 to initiate position determination at step 1011. Here, the SUPL POS INIT message includes information on a session identifier (session-ID), a location identifier (LID) for identifying a currently located network, a capability of the SN 1070, a capability of the GW 1060, and a version (VER).

Upon receiving the SUPL POS INIT message, the SLP 1010 interworks with the LRS 1050 and performs an SUPL POS procedure, thereby determining a position of the SN 1070 at step 1013. At this time, there can be a case where a position of the GW 1060 should be first determined in order to determine the position of the SN 1070. In this case, the position of the GW 1060 is determined concurrently. The order of the position determination of the GW 1060 and the position determination of the SN 1070 is irrelevant.

In a case where the position determination of the SN 1070 ends, the SLP 1010 sends an SUPL END message to the LRS 1050 to end an SUPL session at step 1015. Here, the SUPL END message includes a session-ID.

Also, the SLP 1010 sends an MLP SLIA message to the SUPL agent (not shown) to forward the position information of the SN 1070 at step 1017.

Figure 11:
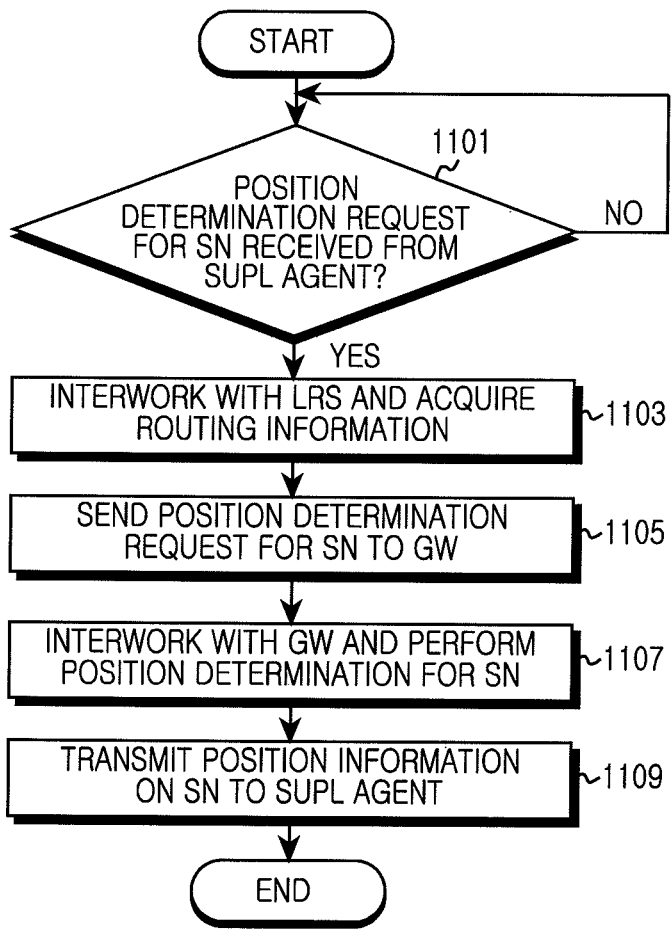
FIG. 11 is a signal flow diagram illustrating an operation method of a Secure User Plane Location (SUPL) Location Platform (SLP) for determining a position of an SN, in a network-initiated proxy mode in a location service based system according to an exemplary embodiment of the present invention.

FIG. 11 is a signal flow diagram illustrating an operation method of an SLP for determining a position of an SN, in a network-initiated proxy mode in a location service based system according to an exemplary embodiment of the present invention.

Referring to FIG. 11, in step 1101, the SLP checks if a position determination request for an SN is received from an SUPL agent. That is, the SLP checks if an immediate service, a periodic triggered service, or an area event based triggered service is requested about a current position of the SN.

When it is determined in step 1101 that the position determination request for the SN is received from the SUPL agent, in step 1103 the SLP interworks with an LRS and acquires routing information of the SN. That is, the SLP acquires information on a GW mapped to the SN.

After that, in step 1105, the SLP sends a position determination start request for the SN to the GW mapped to the SN using the acquired routing information.

Next, in step 1107, the SLP interworks with the GW and performs position determination for the SN. In a case of the periodic triggered service, the position determination for the SN is performed every corresponding reporting period.

After that, in step 1109, the SLP transmits the position information on the SN acquired through the position determination performance, to the SUPL agent. In a case of the periodic triggered service, the position information on the SN acquired through the position determination performance is transmitted every corresponding reporting period. In a case of the area event based triggered service, the position information on the SN acquired through the position determination performance is transmitted when an area-based event occurs.

Next, the SLP terminates the algorithm according to the present invention.

Here, in a case of a network-initiated non-proxy mode, steps 1101, 1103, 1105, and 1109 are carried out by an SLC, and step 1107 is carried out by an SPC. The SLC and SPC are connected through internal communications.

Figure 12:
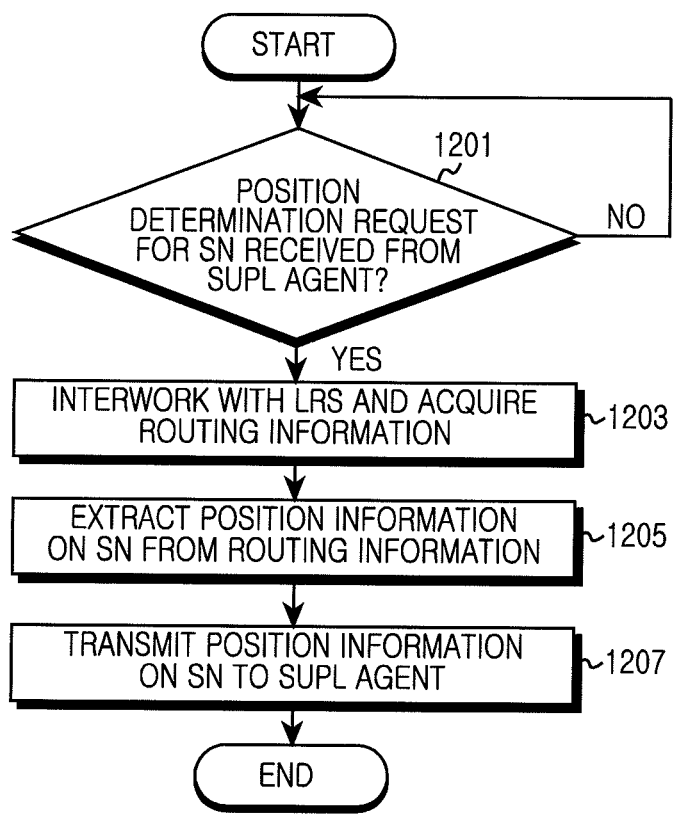
FIG. 12 is a flowchart illustrating an operation method of an SLP for determining a position of an SN in a case where an LRS has position information of the SN meeting an EQOP, in a network-initiated proxy mode in a location service based system according to an exemplary embodiment of the present invention.

FIG. 12 is a flowchart illustrating an operation method of an SLP for determining a position of an SN in a case where an LRS has position information of the SN meeting an EQOP, in a network-initiated proxy mode in a location service based system according to an exemplary embodiment of the present invention.

Referring to FIG. 12, in step 1201, the SLP checks if a position determination request for an SN is received from an SUPL agent.

When it is determined in step 1201 that the position determination request for the SN is received from the SUPL agent, in step 1203 the SLP interworks with an LRS and acquires routing information of the SN.

Next, in step 1205, the SLP extracts position information on the SN from the acquired routing information.

After that, in step 1207, the SLP transmits the extracted position information on the SN to the SUPL agent.

Next, the SLP terminates the algorithm according to the present invention.

Figure 13:
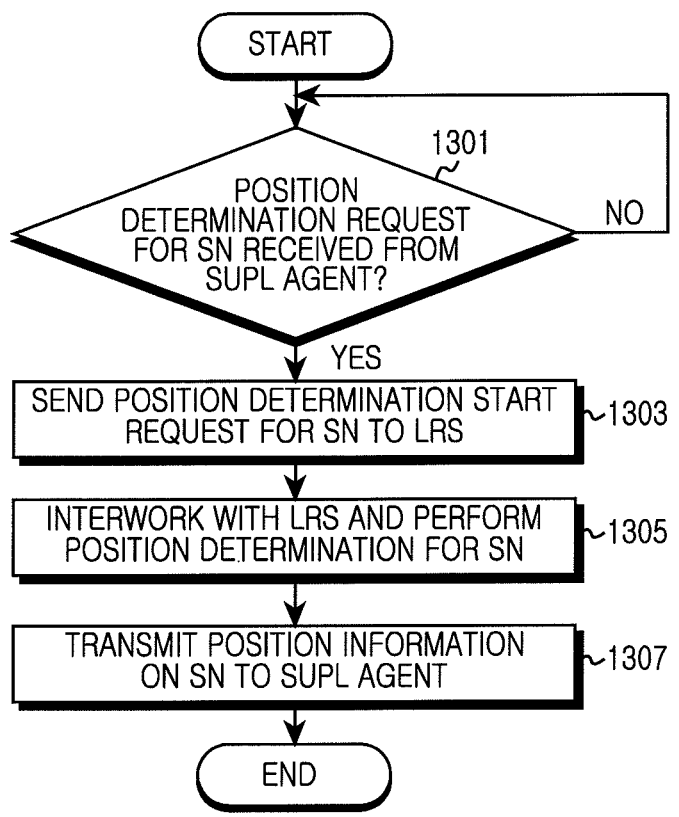
FIG. 13 is a flowchart illustrating an operation method of an SLP for determining a position of an SN in a case where an LRS performs position determination in place of the SN, in a network-initiated proxy mode in a location service based system according to an exemplary embodiment of the present invention.

FIG. 13 is a flowchart illustrating an operation method of an SLP for determining a position of an SN in a case where an LRS performs position determination in place of the SN, in a network-initiated proxy mode in a location service based system according to an exemplary embodiment of the present invention.

Referring to FIG. 13, in step 1301, the SLP checks if a position determination request for an SN is received from an SUPL agent.

When it is determined in step 1301 that the position determination request for the SN is received from the SUPL agent, in step 1303 the SLP sends a position determination start request for the SN to an LRS.

Next, in step 1305, the SLP interworks with the LRS and performs position determination for the SN.

After that, in step 1307, the SLP transmits the position information on the SN, acquired through the position determination performance, to the SUPL agent.

Next, the SLP terminates the algorithm according to the present invention.

Figure 14:
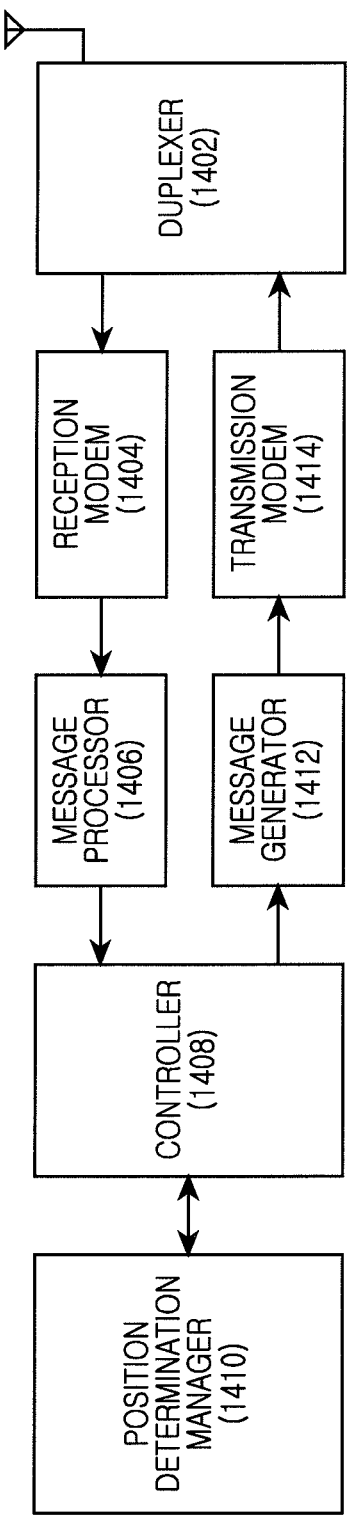
FIG. 14 is a block diagram illustrating a construction of an SLP in a location service based system according to an exemplary embodiment of the present invention.

FIG. 14 is a block diagram illustrating a construction of an SLP in a location service based system according to an exemplary embodiment of the present invention. Here, the SLP, a GW, an LRS, an SLC, and an SPC can have the same block construction.

As illustrated, the SLP includes a duplexer 1402, a reception modulator/demodulator (modem) 1404, a message processor 1406, a controller 1408, a position determination manager 1410, a message generator 1412, and a transmission modem 1414.

Referring to FIG. 14, the duplexer 1402 transmits a transmit signal provided from the transmission modem 1414, through an antenna according to a duplexing scheme, and provides the reception modem 1404 with a receive signal from the antenna.

The reception modem 1404 restores data from a signal provided from the duplexer 1402 and forwards the data to the message processor 1406. For example, the reception modem 1404 may include a Radio Frequency (RF) reception block, a demodulation block, a channel decoding block, and the like (not shown). At this time, the RF reception block includes a filter, an RF preprocessor, and the like. In a case where a wireless communication system uses an Orthogonal Frequency Division Multiplexing (OFDM) scheme, the demodulation block includes a Fast Fourier Transform (FFT) operator for extracting data loaded in each subcarrier, and the like. The channel decoding block includes a demodulator, a de-interleaver, a channel decoder and the like.

The message processor 1406 analyzes a message received through the reception modem 1404 and provides the result to the controller 1408.

The controller 1408 controls the whole transmission/reception operation of the SLP. Particularly, the controller 1408 provides the position determination manager 1410 with information received from the message processor 1406, and provides the message generator 1412 with information provided from the position determination manager 1410.

In one exemplary embodiment, if a position determination request for an SN is received from an SUPL agent through the reception modem 1404 and message processor 1406, the position determination manager 1410 interworks with an LRS through the message generator 1412, transmission modem 1414, reception modem 1404, and message processor 1406 and acquires routing information of the SN. Also, the position determination manager 1410 of the SLP sends a position determination start request for the SN to a GW mapped to the SN using the acquired routing information through the message generator 1412 and transmission modem 1414, interworks with the GW through the message generator 1412, transmission modem 1414, reception modem 1404, and message processor 1406 to perform position determination for the SN, and transmits position information on the SN acquired through the position determination performance, to the SUPL agent through the message generator 1412 and transmission modem 1414.

Or, in another exemplary embodiment, if a position determination request for an SN is received from an SUPL agent through the reception modem 1404 and message processor 1406, the position determination manager 1410 interworks with an LRS through the message generator 1412, transmission modem 1414, reception modem 1404, and message processor 1406 and acquires routing information of the SN. The position determination manager 1410 of the SLP extracts position information on the SN from the acquired routing information of the SN, and transmits the extracted position information on the SN to the SUPL agent through the message generator 1412 and transmission modem 1414.

Or, in a further exemplary embodiment, if a position determination request for an SN is received from an SUPL agent through the reception modem 1404 and message processor 1406, the position determination manager 1410 sends a position determination start request for the SN to an LRS through the message generator 1412 and transmission modem 1414, interworks with the LRS through the message generator 1412, transmission modem 1414, reception modem 1404, and message processor 1406 and performs position determination for the SN, and then transmits position information on the SN acquired through the position determination performance to the SUPL agent through the message generator 1412 and transmission modem 1414.

The message generator 1412 generates a message to be transmitted under the control of the controller 1408 and provides the message to the transmission modem 1414.

The transmission modem 1414 converts a message or transmission data provided from the message generator 1412 into a form for transmission, through wireless resources and provides the message or transmission data to the duplexer 1402. For instance, the transmission modem 1414 may include a channel coding block, a modulation block, an RF transmission block and the like (now shown). At this time, the channel coding block includes a modulator, an interleaver, a channel encoder, and the like. In a case where a wireless communication system uses an OFDM scheme, the modulation block includes an Inverse Fast Fourier Transform (IFFT) operator for mapping data to each subcarrier, and the like. The RF transmission block includes a filter, an RF preprocessor, and the like.

As described above, exemplary embodiments of the present invention provide an advantage of determining a position of a device connected through a GW, i.e., a terminal (e.g., a sensor node) whose routing to an IP address is impossible, by expanding standardized protocols for the sake of determining a position of a device having the IP address in OMA in a location service based system.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. An operation method of a Secure User Plane Location (SUPL) Location Platform (SLP) for determining a position of a sensor node in a location service based system, the method comprising:
   receiving a position determination request for the sensor node from an SUPL agent;
   interworking with a Location Registration Server (LRS) and acquiring routing information from the LRS of a gateway mapped to the sensor node;
   sending a position determination start request for the sensor node to the gateway using the acquired routing information; and
   interworking with the gateway and determining the position of the sensor node,
   wherein the routing information comprises mapping information of a sensor node identifier and a gateway identifier and capability information of the sensor node and the gateway.

2. The method of claim 1, wherein the receiving of the position determination request for the sensor node comprises receiving a request for one of an immediate service, a periodic triggered service, and an area event based triggered service about the position of the sensor node.

3. The method of claim 2, wherein, in a case of the periodic triggered service, the position of the sensor node is updated every corresponding reporting period.

4. The method of claim 2, further comprising transmitting the acquired position information on the sensor node to the SUPL agent.

5. The method of claim 4, wherein, in a case of the periodic triggered service, the acquired position information on the sensor node is transmitted every corresponding reporting period.

6. The method of claim 4, wherein, in a case of the area event based triggered service, the acquired position information on the sensor node is transmitted when an area-based event occurs.

7. The method of claim 1, wherein the SLP includes an SUPL Location Center (SLC) and an SUPL Positioning Center (SPC), and the SLC and the SPC are associated with each other through internal communications.

8. An operation method of a Secure User Plane Location (SUPL) Location Platform (SLP) for determining a position of a sensor node in a location service based system, the method comprising:
receiving a position determination request for the sensor node from an SUPL agent;
interworking with a Location Registration Server (LRS) and acquiring routing information from the LRS of a gateway mapped to the sensor node;
determining position information on the sensor node from the acquired routing information; and
transmitting the determined position information on the sensor node to the SUPL agent,
wherein the routing information comprises mapping information of a sensor node identifier and a gateway identifier and capability information of the sensor node and the gateway.

9. An operation method of a Secure User Plane Location (SUPL) Location Platform (SLP) for determining a position of a sensor node in a location service based system, the method comprising:
receiving a position determination request for the sensor node from an SUPL agent;
sending a position determination start request for the sensor node to a Location Registration Server (LRS); and
interworking with the LRS and determining the position of the sensor node,
wherein the LRS provides information of a gateway mapped to the sensor node, and
wherein the routing information comprises mapping information of a sensor node identifier and a gateway identifier and capability information of the sensor node and the gateway.

10. The method of claim 9, further comprising transmitting the acquired position information on the sensor node to the SUPL agent.

11. The method of claim 9, wherein the receiving of the position determination request for the sensor node comprises receiving a request for one of an immediate service, a periodic triggered service, and an area event based triggered service about the position of the sensor node.

12. A Secure User Plane Location (SUPL) Location Platform (SLP) apparatus for determining a position of a sensor node in a location service based system, the apparatus comprising:
a reception modulator/demodulator (modem) for receiving a position determination request for the sensor node from an SUPL agent;
a position determination manager for interworking with a Location Registration Server (LRS) and acquiring from the LRS routing information of a gateway mapped to the sensor node; and
a transmission modem for sending a position determination start request for the sensor node to the gateway using the acquired routing information,
wherein the position determination manager interworks with the gateway and determines the position of the sensor node, and
wherein the routing information comprises mapping information of a sensor node identifier and a gateway identifier and capability information of the sensor node and the gateway.

13. The apparatus of claim 12, wherein the reception modem receives the position determination request for the sensor node by receiving a request for one of an immediate service, a periodic triggered service, and an area event based triggered service about the position of the sensor node.

14. The apparatus of claim 13, wherein, in a case of the periodic triggered service, the position of the sensor node is updated every corresponding reporting period.

15. The apparatus of claim 13, wherein the transmission modem transmits the acquired position information on the sensor node to the SUPL agent.

16. The apparatus of claim 15, wherein, in a case of the periodic triggered service, the acquired position information on the sensor node is transmitted every corresponding reporting period.

17. The apparatus of claim 15, wherein, in a case of the area event based triggered service, the acquired position information on the sensor node is transmitted when an area-based event occurs.

18. The apparatus of claim 12, wherein the SLP comprises an SUPL Location Center (SLC) and an SUPL Positioning Center (SPC), and the SLC and the SPC are associated with each other through internal communications.

19. A Secure User Plane Location (SUPL) Location Platform (SLP) apparatus for determining a position of a sensor node in a location service based system, the apparatus comprising:
a reception modulator/demodulator (modem) for receiving a position determination request for the sensor node from an SUPL agent;
a position determination manager for interworking with a Location Registration Server (LRS), for acquiring from the LRS routing information of a gateway mapped to the sensor node, and for determining position information on the sensor node from the acquired routing information; and
a transmission modem for transmitting the determined position information on the sensor node to the SUPL agent,
wherein the routing information comprises mapping information of a sensor node identifier and a gateway identifier and capability information of the sensor node and the gateway.

20. A Secure User Plane Location (SUPL) Location Platform (SLP) apparatus for determining a position of a sensor node in a location service based system, the apparatus comprising:
a reception modem for receiving a position determination request for the sensor node from an SUPL agent;
a transmission modem for sending a position determination start request for the sensor node to a Location Registration Server (LRS); and
a position determination manager for interworking with the LRS and determining the position of the sensor node,
wherein the LRS provides information of a gateway mapped to the sensor node, and
wherein the routing information comprises mapping information of a sensor node identifier and a gateway identifier and capability information of the sensor node and the gateway.

21. The apparatus of claim 20, wherein the transmission modem transmits the acquired position information on the sensor node to the SUPL agent.

22. The apparatus of claim 20, wherein the reception modem receives the position determination request for the sensor node by receiving a request for one of an immediate service, a periodic triggered service, and an area event based triggered service about the position of the sensor node.

* * * * *